(12) United States Patent
Endo et al.

(10) Patent No.: US 11,968,339 B2
(45) Date of Patent: Apr. 23, 2024

(54) READING DEVICE AND IMAGE FORMING APPARATUS

(71) Applicant: FUJIFILM Business Innovation Corp., Tokyo (JP)

(72) Inventors: Taisuke Endo, Kanagawa (JP); Keigo Shinoto, Kanagawa (JP); Maho Satani, Kanagawa (JP); Kei Otagiri, Kanagawa (JP); Kei Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 327 days.

(21) Appl. No.: 17/542,487

(22) Filed: Dec. 5, 2021

(65) Prior Publication Data
US 2023/0057360 A1    Feb. 23, 2023

(30) Foreign Application Priority Data

Aug. 23, 2021 (JP) .................. 2021-135282

(51) Int. Cl.
*H04N 1/04* (2006.01)
*H04N 1/00* (2006.01)

(52) U.S. Cl.
CPC ..... *H04N 1/00559* (2013.01); *H04N 1/00392* (2013.01); *H04N 1/00557* (2013.01); *H04N 1/00795* (2013.01)

(58) Field of Classification Search
None
See application file for complete search history.

(56) References Cited

U.S. PATENT DOCUMENTS

2007/0076268 A1\* 4/2007 Shojo ................. H04N 1/19594
358/401

FOREIGN PATENT DOCUMENTS

| JP | 2003157432 | 5/2003 |
| JP | 2013214917 | 10/2013 |

\* cited by examiner

*Primary Examiner* — Cheukfan Lee
(74) *Attorney, Agent, or Firm* — JCIPRNET

(57) ABSTRACT

A reading device includes a base on which a read target object is placed, a reader that reads the read target object placed on the base, a first attachment frame to which the reader is attached such that the reader is disposed above the base, an operation unit that is used for operating the reading device by touching, a second attachment frame to which the operation unit is attached such that the operation unit is disposed above the base, and a support frame that has a first surface and a second surface more bendable than the first surface in response to an external force. The first attachment frame is fixed to the first surface of the support frame. The second attachment frame is fixed to the second surface of the support frame.

17 Claims, 16 Drawing Sheets

READING DEVICE AND IMAGE FORMING APPARATUS

CROSS-REFERENCE TO RELATED APPLICATIONS

This application is based on and claims priority under 35 USC 119 from Japanese Patent Application No. 2021-135282 filed Aug. 23, 2021.

BACKGROUND

(i) Technical Field

The present disclosure relates to reading devices and image forming apparatuses.

(ii) Related Art

Japanese Unexamined Patent Application Publication No. 2003-157432 (paragraph [0038], FIG. 1) describes an imaging apparatus having a document base unit on which a document serving as an imaging target object is placed, an imaging unit, such as a document camera, capturing an image of the document placed on the document base unit, a movable retaining member that retains the imaging unit and is attached to the rear end of the upper surface of the document base unit such that the imaging unit is disposed above the document base unit, and an operation panel disposed at the front end of the upper surface of the document base unit.

Japanese Unexamined Patent Application Publication No. 2013-214917 (FIG. 1) describes a reading device having a stage on which a read target object is placed, a read head, such as a document camera, optically reading the read target object placed on the stage, and an articulated boom that supports the read head above the read target object in such a manner that the read head is positionally adjustable toward and away from the read target object.

SUMMARY

Aspects of non-limiting embodiments of the present disclosure relate to a reading device and an image forming apparatus that may suppress shaking of a reader that reads a read target object when an operation unit disposed above a base on which the read target object is placed is operated by being touched, as compared with a case where a first attachment frame to which the reader is attached and a second attachment frame to which the operation unit is attached are both fixed to the same surface of a support frame.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a reading device including a base on which a read target object is placed, a reader that reads the read target object placed on the base, a first attachment frame to which the reader is attached such that the reader is disposed above the base, an operation unit that is used for operating the reading device by touching, a second attachment frame to which the operation unit is attached such that the operation unit is disposed above the base, and a support frame that has a first surface and a second surface more bendable than the first surface in response to an external force, wherein the first attachment frame is fixed to the first surface of the support frame, and the second attachment frame is fixed to the second surface of the support frame.

BRIEF DESCRIPTION OF THE DRAWINGS

Exemplary embodiments of the present disclosure will be described in detail based on the following figures, wherein.

DETAILED DESCRIPTION

Exemplary embodiments of the disclosure will be described below with reference to the drawings.

First Exemplary Embodiment

Figure 1:
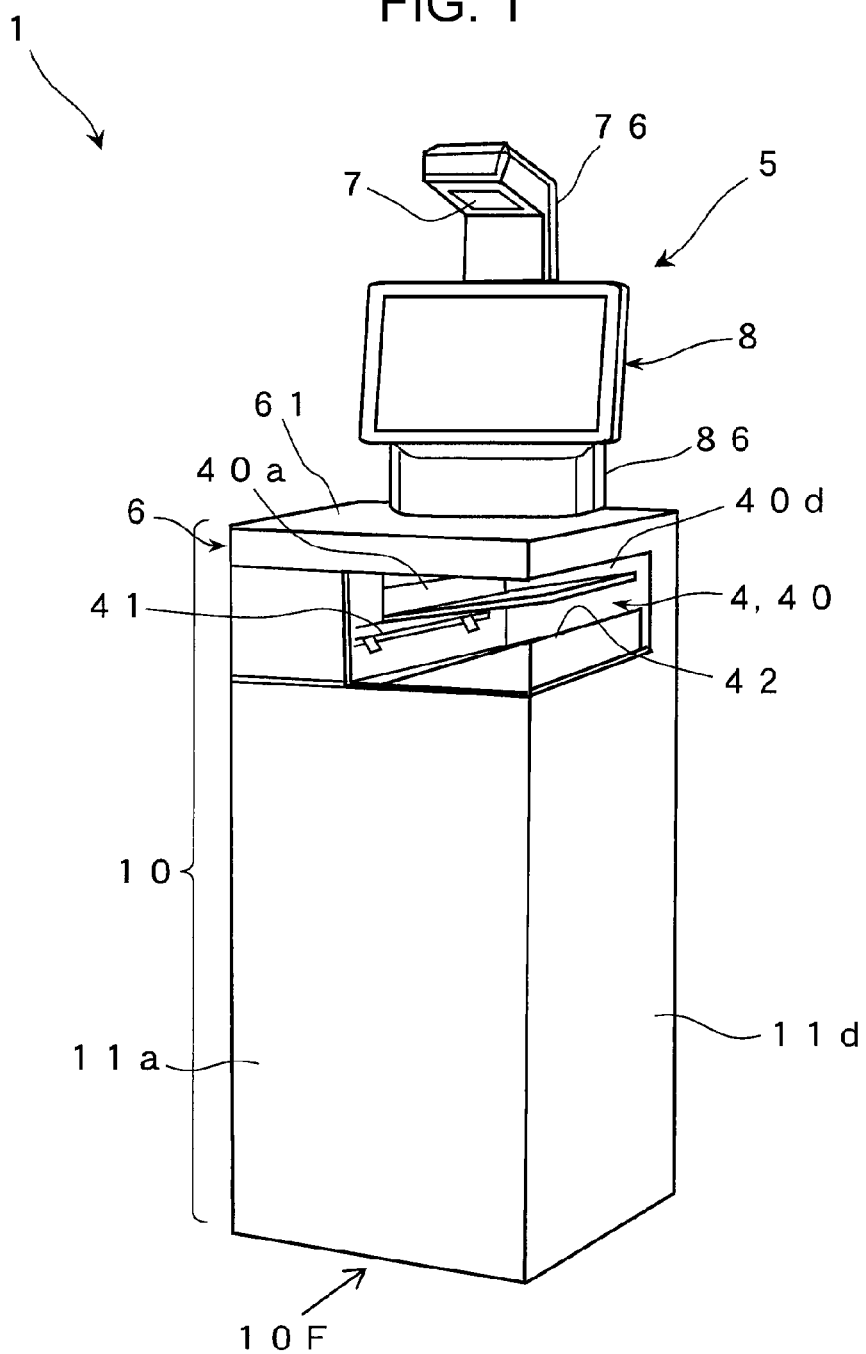
FIG. 1 is a perspective view schematically illustrating an image forming apparatus according to a first exemplary embodiment.
Figure 2:
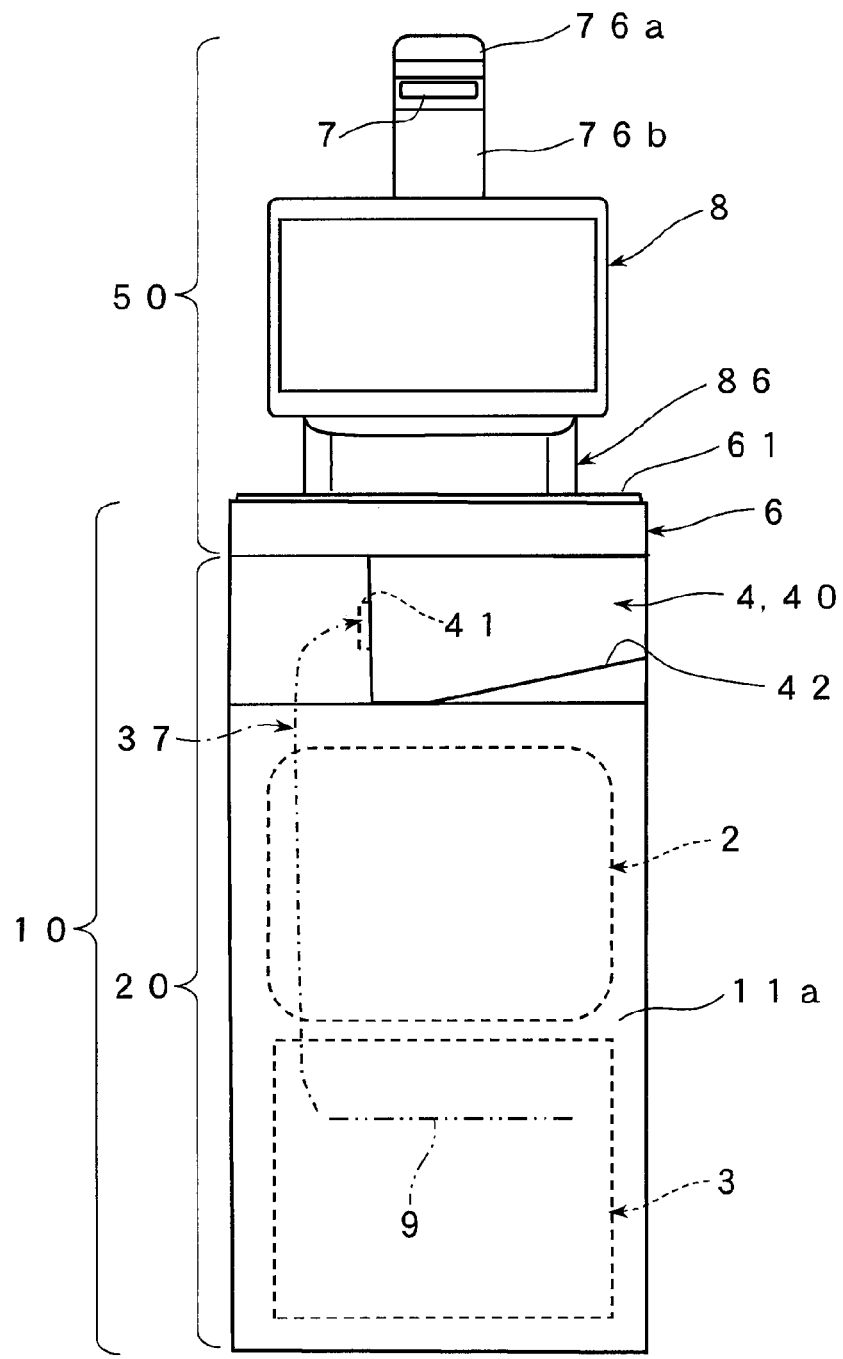
FIG. 2 is a front view schematically illustrating the image forming apparatus in FIG. 1.
Figure 2:
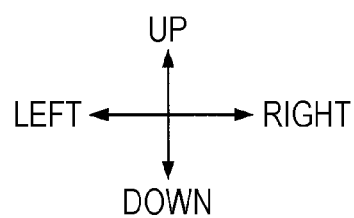

FIG. 1 is an external view schematically illustrating an image forming apparatus 1 according to a first exemplary embodiment of the disclosure. FIG. 2 is a front view schematically illustrating the image forming apparatus 1. In the drawings including FIG. 1, up and down directions, left and right directions, and front and rear directions indicated with arrows are directions expressed with reference to a front surface 10F of the image forming apparatus 1, assuming that a user is standing facing the image forming apparatus 1 when using the image forming apparatus 1.

Image Forming Apparatus

As shown in FIGS. 1 and 2, the image forming apparatus 1 according to the first exemplary embodiment includes a housing 10 constituted of an internal framework section and an exterior section, an image forming unit 20 disposed in a lower inner section excluding the upper end of the housing 10, and a reading unit 50 disposed at the upper end of the housing 10.

The housing 10 is a structural body having a predetermined structure and shape and formed of components, such as multiple frames and an external cover.

As shown in FIG. 1, the housing 10 according to the first exemplary embodiment is a rectangular-parallelepiped structural body that is long in the up-down direction.

Figure 3:
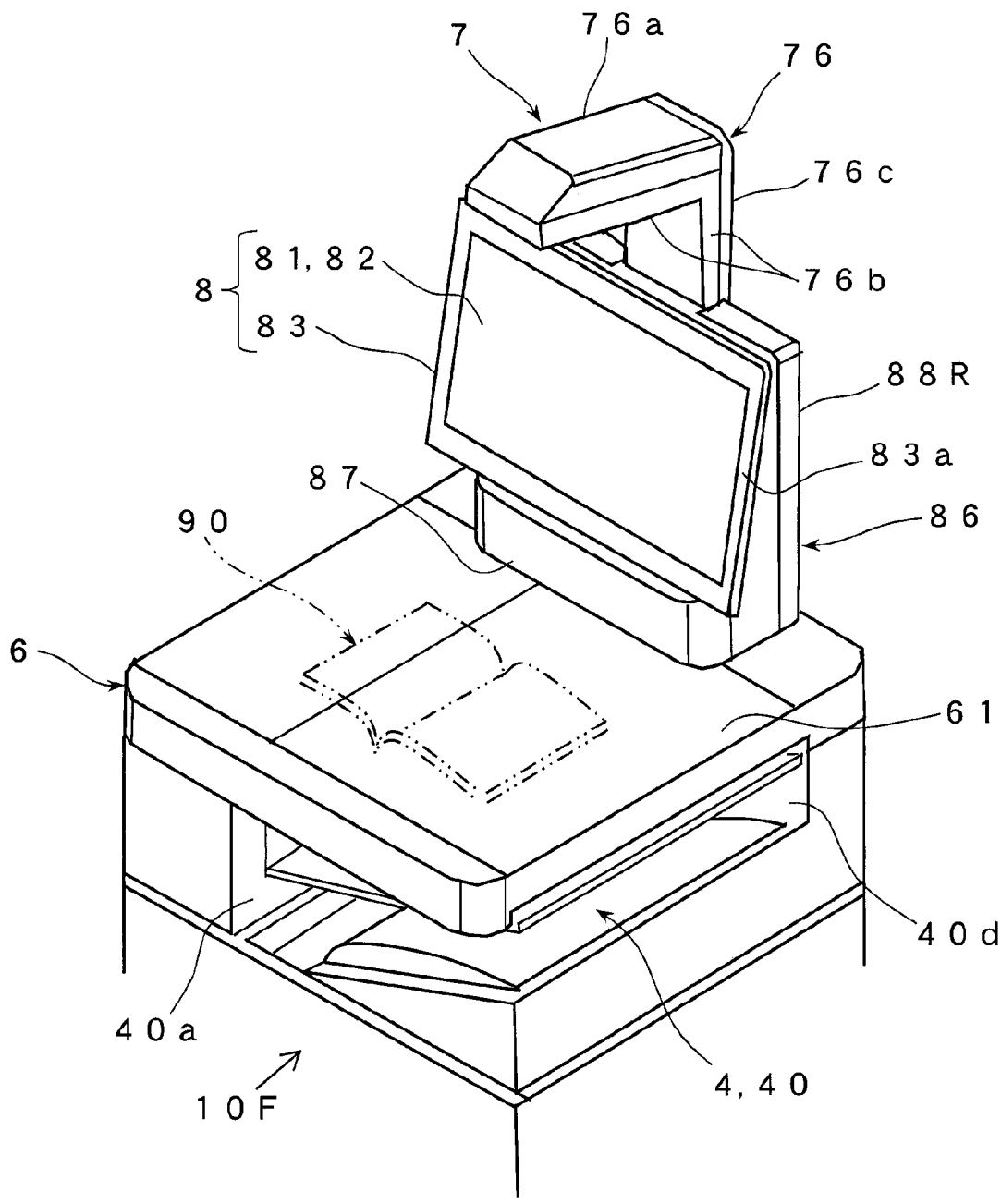
FIG. 3 is a perspective view illustrating a reading unit of the image forming apparatus in FIG. 1.
Figure 5:
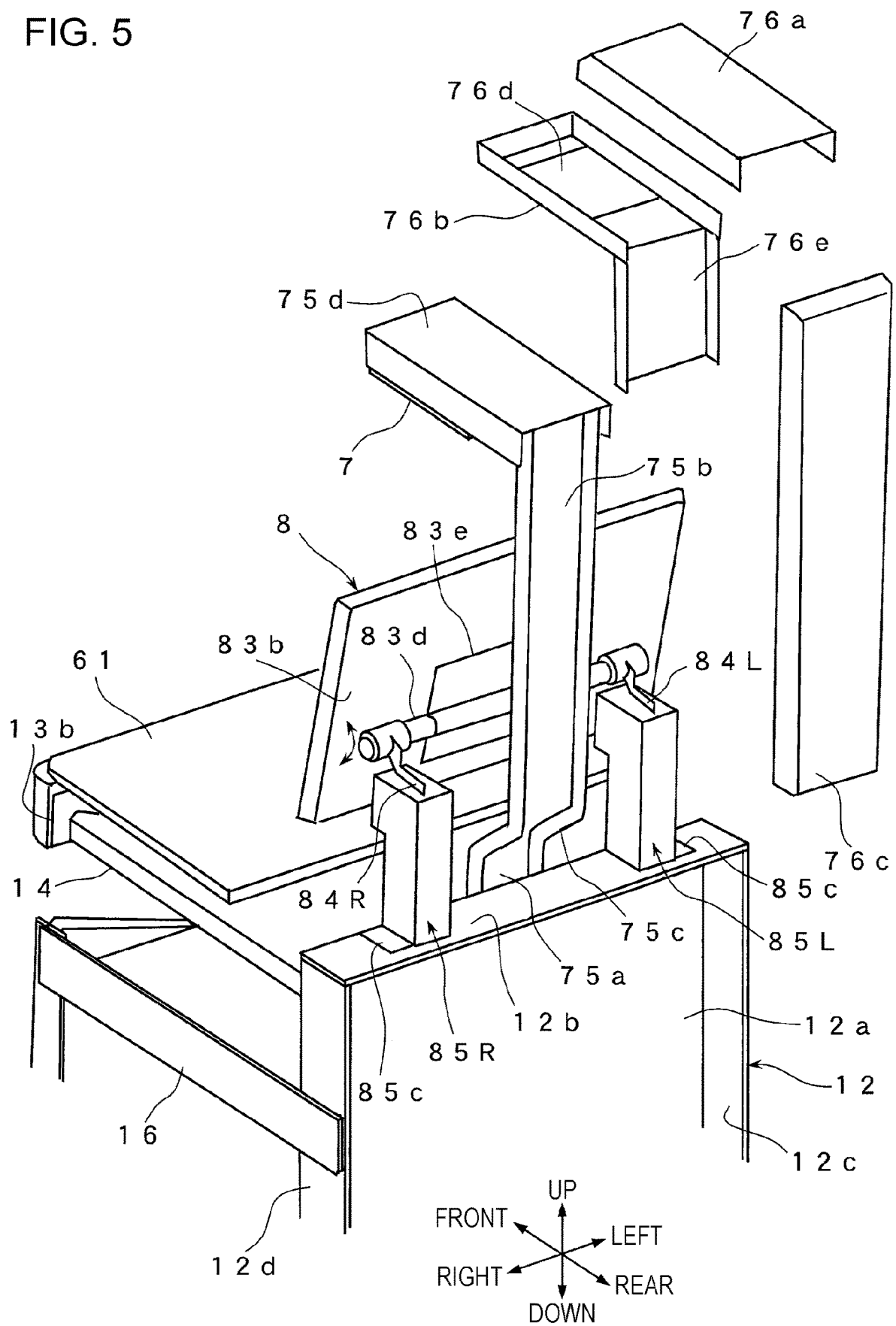
FIG. 5 is a perspective view illustrating the rear side of the reading unit from which a first cover has been removed.
Figure 6:
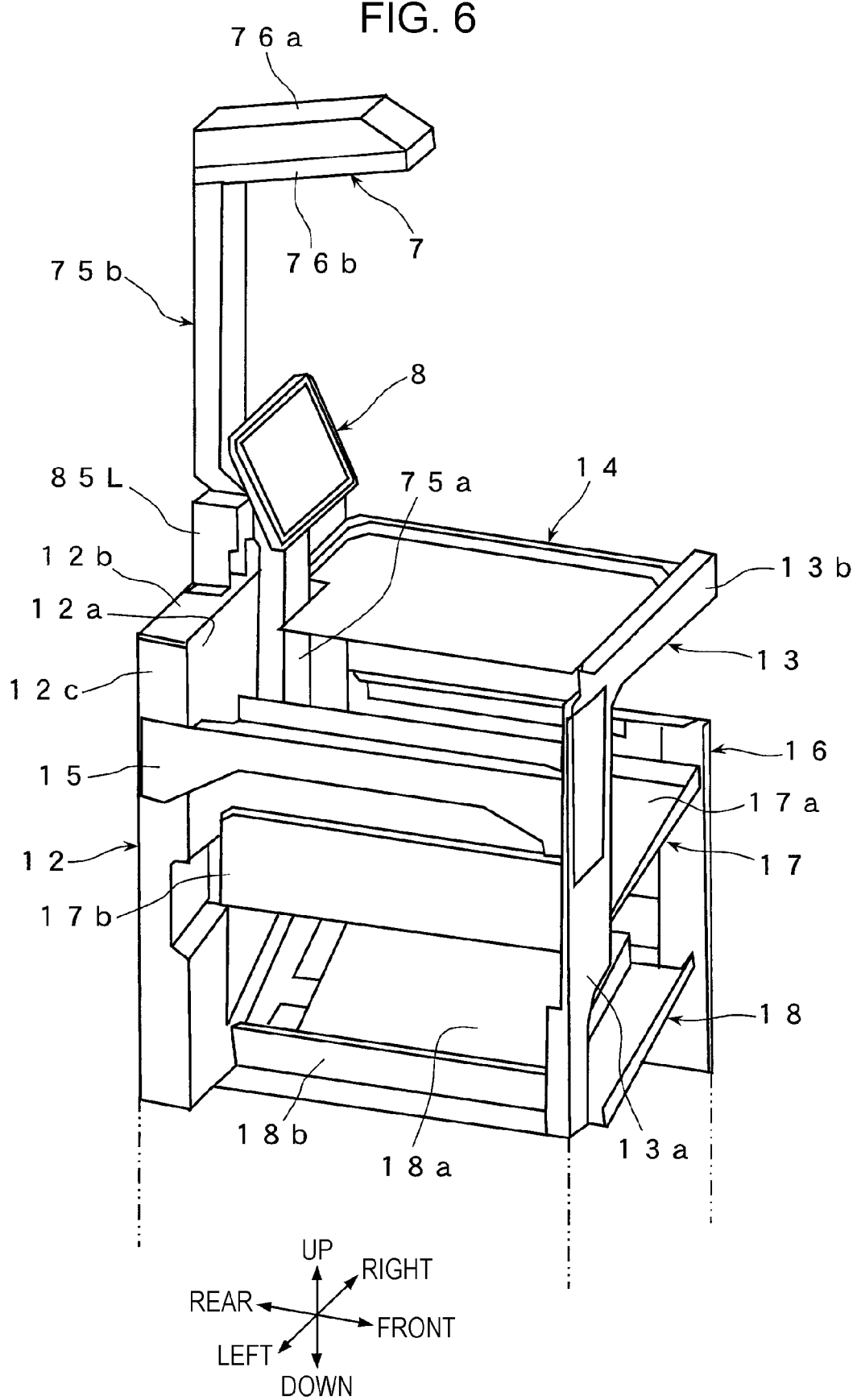
FIG. 6 is a perspective view illustrating a framework section in a part of the reading unit of the image forming apparatus.

As shown in FIGS. 5 and 6, the internal framework section of the housing 10 includes frames, such as a rear frame 12, a front frame 13, an upper frame 14, a left side frame 15, a right side frame 16, and multiple partition frames 17 and 18. Furthermore, as shown in FIGS. 1 and 3, the exterior section of the housing 10 includes external covers, such as a front cover 11a, a side cover 11d, and a rear cover (not shown). At least one of the external covers serves as an open-close cover that is openable and closable.

The image forming unit 20 is configured to form an image corresponding image information onto a recording medium 9.

The image forming unit 20 according to the first exemplary embodiment has an imaging section 2 that creates an image and forms the image on the recording medium 9, a medium feeding section 3 that accommodates the recording medium 9 to be used by the imaging section 2 and feeds the recording medium 9 to the imaging section 2, and a medium output section 4 to which the recording medium 9 having the image formed thereon by the imaging section 2 is output. The recording medium 9 used is, for example, sheet-like plain paper, coated paper, or cardboard having a predetermined size.

The imaging section 2 in the image forming unit 20 is constituted by using an electrophotographic imaging device that ultimately forms an image formed of a developer onto the recording medium 9.

The imaging section 2 constituted of the electrophotographic imaging device includes an image bearing member, such as a photoconductor, devices, such as a charging device, an exposure device, a developing device, and a transfer device, arranged around the image bearing member, and a fixing device disposed at a position located away from the image bearing member. None of the above devices is shown. The imaging section 2 also includes devices, such as a developer supplier, an image processor, and a controller. Of these devices, the transfer device used is a direct transfer device that directly transfers the image formed of the developer formed on the image bearing member onto the recording medium 9 or an intermediate transfer device that transfers the image from the image bearing member onto the recording medium 9 via an intermediate transfer member.

The imaging section 2 has a function of forming an image corresponding to image information input from an external apparatus, such as an information terminal, connected to the image forming apparatus 1 and a function of using information read by the reading unit 50 as image information and forming an image corresponding to the image information.

Thus, the imaging section 2 performs a charging process on the image bearing member in the aforementioned imaging device, and exposure, developing, and transfer processes corresponding to the image information in that order. Consequently, in the imaging section 2, the image formed of the developer is created on the image bearing member, and the image is subsequently transferred onto the recording medium 9 from the image bearing member. Moreover, in the imaging section 2, a fixing process is performed on the recording medium 9 having the image transferred thereon, whereby the image is fixed onto the recording medium 9.

The medium feeding section 3 in the image forming unit 20 is disposed below the imaging section 2. The medium feeding section 3 includes an accommodation member, such as a tray, accommodating the recording medium 9 and a delivery device that delivers the recording medium 9 from the accommodation member. None of these components is shown.

The accommodation member is attached such that an accommodation process for the recording medium 9 is possible by drawing the accommodation member out from inside the housing 10. The accommodation member may be a single accommodation member or multiple accommodation members. Furthermore, the number of delivery devices disposed is equal to the number of accommodation members.

In the medium feeding section 3, a predetermined recording medium 9 is delivered toward the imaging section 2 in accordance with a transfer process in the imaging section 2. In FIG. 2, reference sign 37 denotes a medium transport path along which the recording medium 9 is transported toward an outlet 41 from the medium feeding section 3 via a part of the imaging section 2 (i.e., a part where an image is to be transferred onto the recording medium 9).

The medium output section 4 in the image forming unit 20 is disposed above the imaging section 2. The medium output section 4 has an output space 40 in an upper part of the front surface 10F of the housing 10. The output space 40 is an outward-facing opening space having a front opening 40a offset toward the right and a side opening 40d extending continuously from the front surface 10F to the right side surface.

The medium output section 4 is provided with the outlet 41 for the recording medium 9 at the left inner wall surface of the output space 40, and is also provided with a load surface 42 at the base of the output space 40. The load surface 42 holds and accommodates the recording medium 9 output from the outlet 41. The load surface 42 is, for example, an inclined surface that increases in height with increasing distance rightward from the outlet 41. In other words, the load surface 42 is a rightward-rising sloped surface.

The recording medium 9 having the image created and fixed thereon in the imaging section 2 is output from the outlet 41 via the medium transport path 37 so as to be accommodated in the medium output section 4.

Reading Unit and Reading Device

As shown in FIGS. 1 and 3, the reading unit 50 is configured to read a read target object 90 placed on a base 6 from above the base 6.

The reading unit 50 is constituted of a reading device 5 including the base 6 on which the read target object 90 is placed, a reader 7 that reads the read target object 90 placed on the base 6, and an operation unit 8 used for operating an apparatus by touching. An operation of an apparatus in the operation unit 8 is an operation of the image forming apparatus 1 including the reading device 5.

The base 6 is formed of a plate-like member having a flat upper surface 61 on which the read target object 90 is placeable in a stationary state. The base 6 is attached to the upper end of the housing 10 such that the upper surface 61 of the base 6 serves as an uppermost surface.

The read target object 90 may be an object that is placeable on the base 6 and readable from above the base 6 by the reader 7. In addition to being a sheet-like document having image information recorded thereon, for example, the read target object 90 may include a three-dimensional object, such as a book, a magazine, a food item, or a plant.

The reader 7 is capable of optically reading the read target object 90 placed on the base 6. The reader 7 used is, for example, a camera having a combination of an imaging element, such as a charge-coupled device (CCD), and an optical element, such as a lens. The camera serving as the reader 7 may also be referred to as a document camera. The reader 7 may also be equipped with an illuminator that illuminates the read target object 90 during a reading process.

Figure 4:
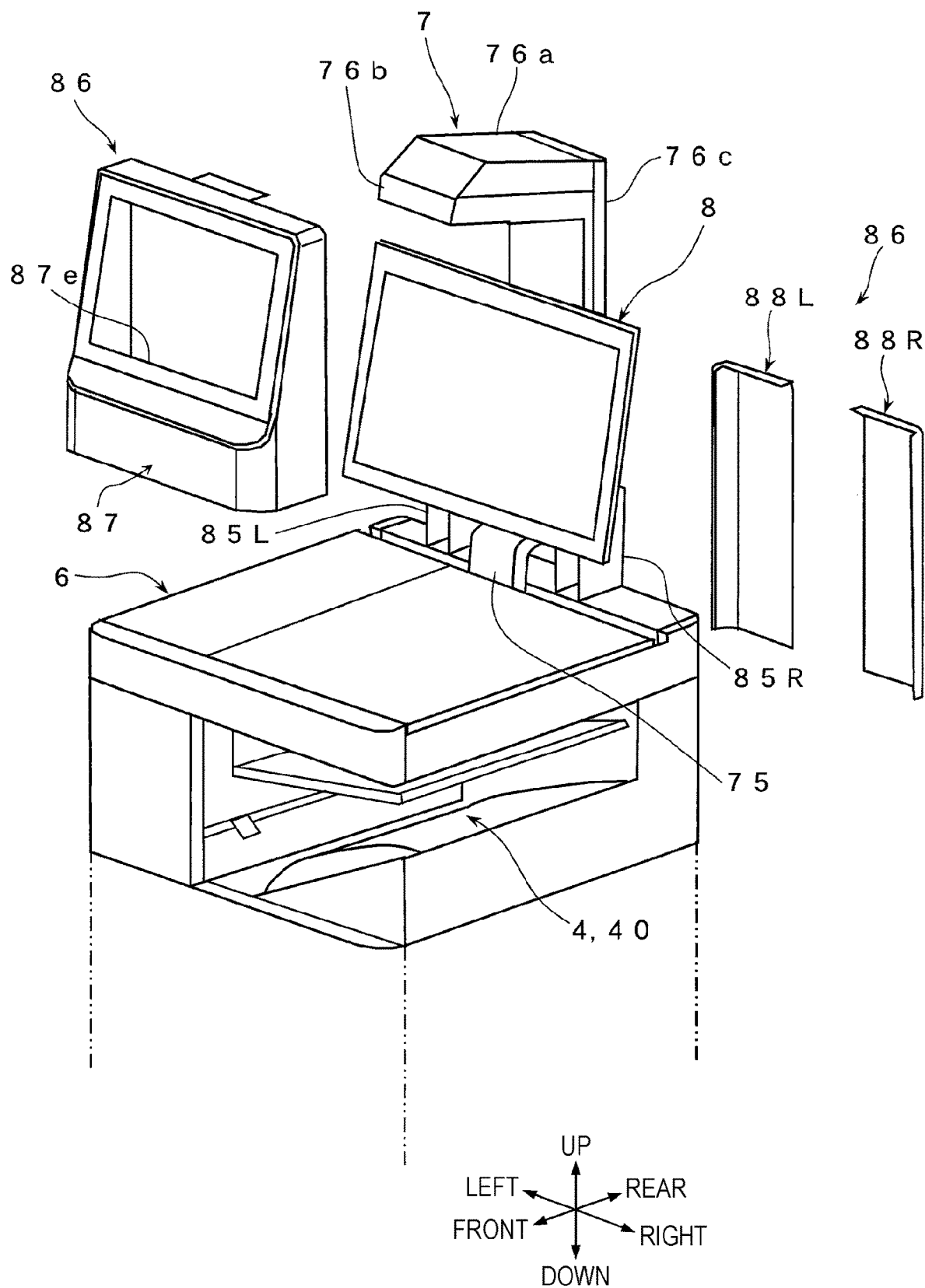
FIG. 4 is a perspective view illustrating the front side of the reading unit from which a second cover has been removed.

As shown in FIGS. 4 and 5, the reader 7 is attached to a position above the base 6 by using a first attachment frame 75. The first attachment frame 75 is disposed as a frame that extends in the height direction of the image forming apparatus 1 behind the operation unit 8.

A detailed description of the first attachment frame 75 will be provided later.

In addition to using the read information as image information to be transmitted to the image forming unit 20 and to be used as a basis for forming an image, the reader 7 is configured to use the read information as image information to be displayed on a display of the operation unit 8.

The reading device 5 is configured to transmit information read by the reader 7 to an image processor in the image forming unit 20 so that the information is processed. Alternatively, the reading device 5 may include an image processor that performs image processing on the information read by the reader 7.

The operation unit 8 is a plate-like structural body at least having an operation section 81 used for operating the image forming apparatus 1 by touching. In addition to the operation section 81, the operation unit 8 may have a display 82 that displays various types of information (such as an image, a video, and so on).

In a case where the operation unit 8 has the display 82, the operation section 81 is constituted of a non-mechanical component, such as a touchscreen operable based on, for example, a resistive film method or an electrostatic capacitive method in which current application and positional detection are performed when an area displayed on the display 82 is touched with a finger or a pen. Alternatively, the operation section 81 may be constituted of a mechanical component, such as a physical button or a physical switch operable by being touched and physically moved by the user of the image forming apparatus 1 with a finger. As another alternative, the operation section 81 may be constituted of a mixture of the aforementioned non-mechanical component and the aforementioned mechanical component.

The display 82 is constituted of a display device, such as a liquid crystal display panel. In a case where the operation section 81 is constituted of the aforementioned non-mechanical component, the display 82 also displays an operation screen to be used in the operation section 81.

In the operation unit 8 according to the first exemplary embodiment, the operation section 81 constituted of the non-mechanical component is included in the display 82. Therefore, in the operation unit 8, as shown in FIG. 3, the display 82 also serving as the operation section 81 is disposed at a front surface 83a of a plate-like support body 83. Such an operation unit 8 is also referred to as, for example, a touchscreen or a touch display.

Furthermore, in the operation unit 8, as shown in FIG. 5, an attachment shaft 83d for attaching the operation unit 8 in a rotatable manner is fixed to a rear surface 83b of the support body 83 by using a stationary plate 83e. The attachment shaft 83d used is, for example, a cylindrical shaft extending in the left-right direction. Moreover, the operation unit 8 includes left and right attachment jigs 84L and 84R that support the left and right ends of the attachment shaft 83d in a rotatable manner and that ultimately attach the operation unit 8 to a second attachment frame 85, to be described later. The operation unit 8 is supported by the attachment jigs 84L and 84R such that a tilt angle of an operation surface is adjustable by rotating the operation unit 8 around the attachment shaft 83d.

In the operation unit 8, one or both of the operation section 81 constituted of a non-mechanical component and the operation section 81 constituted of a mechanical component may be provided at the support body 83 outside the display 82.

Figure 7:
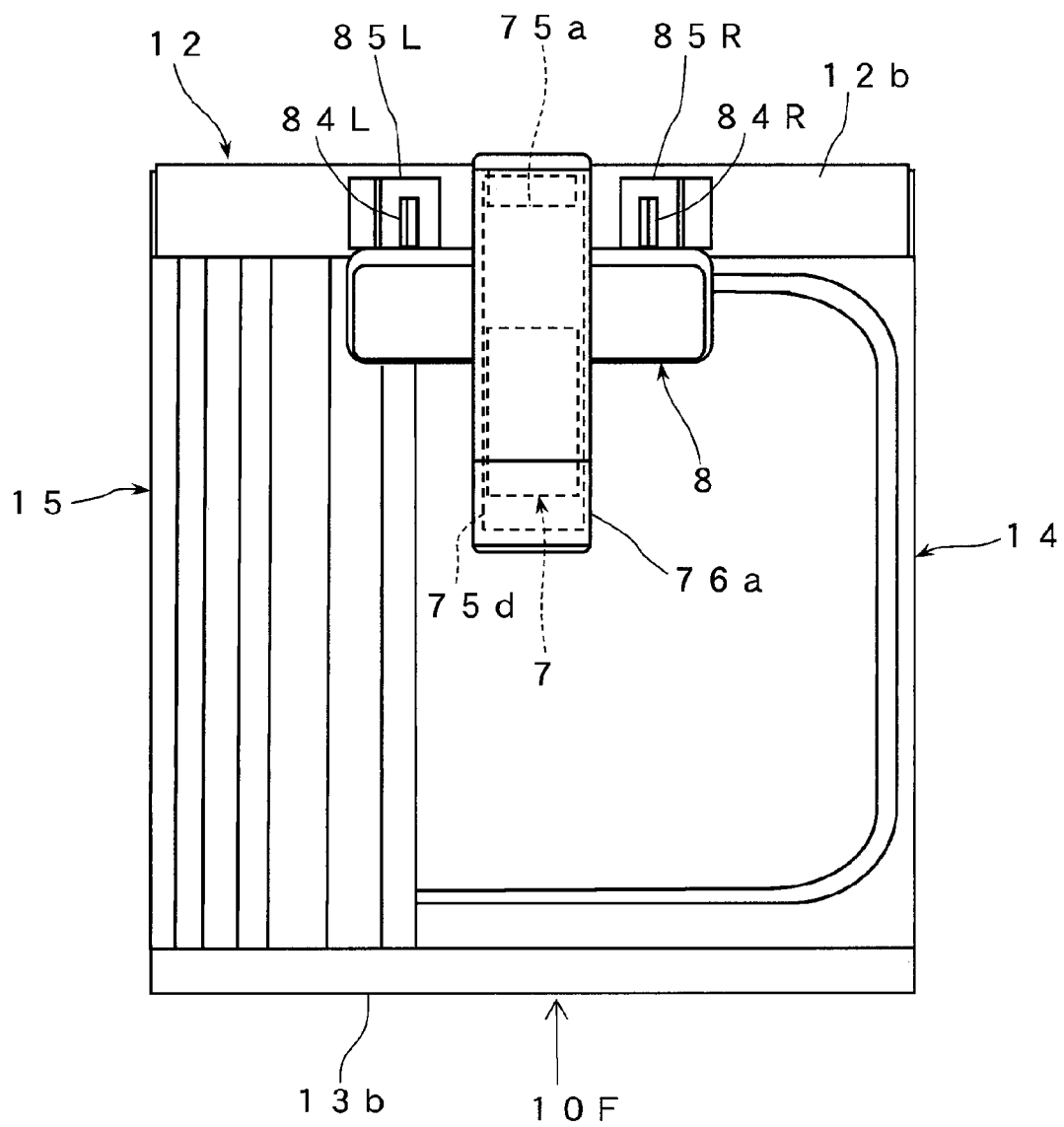
FIG. 7 is a top view schematically illustrating a part of the reading unit in FIG. 6.
Figure 7:
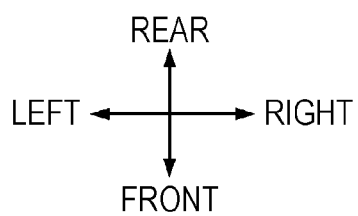

As shown in FIGS. 4 and 5, the operation unit 8 is attached to a position above the base 6 by using the second attachment frame 85. Furthermore, as shown in FIGS. 5 to 7, in the direction extending toward the front surface 10F of the apparatus, the operation unit 8 is disposed in front of a part of the first attachment frame 75 supporting the reader 7 that corresponds to the same height region as the operation unit 8. The second attachment frame 85 supports the operation unit 8 at the rear side thereof.

A detailed description of the second attachment frame 85 will be provided later.

As shown in FIGS. 1 to 5, in the reading device 5 serving as the reading unit 50, the first attachment frame 75 supporting the reader 7 is covered by a first cover 76, and the second attachment frame 85 supporting the operation unit 8 is covered by a second cover 86.

As shown in FIGS. 4 and 5, the first cover 76 is a combination of three split cover components, namely, an upper-end cover component 76a, an upper front cover component 76b, and a rear cover component 76c.

As shown in FIG. 5, an upper front end of the upper front cover component 76b is provided with an opening 76d that allows the reader 7 to extend therethrough to expose the reader 7 downward. An upper rear end of the upper front cover component 76b is provided with a portion 76e that extends downward to cover an upper front surface of the first attachment frame 75.

As shown in FIGS. 3 and 4, the second cover 86 is a combination of three split cover components, namely, a front cover component 87 and left and right rear cover components 88L and 88R.

The front cover component 87 covers a front region between the base 6 and the operation unit 8, as well as left and right side regions and an upper region between the operation unit 8 and the first attachment frame 75. Furthermore, the front cover component 87 is provided with an opening 87e through which a part, such as the second attachment frame 85, located at the rear side of the operation unit 8 is to extend.

Figure 8:
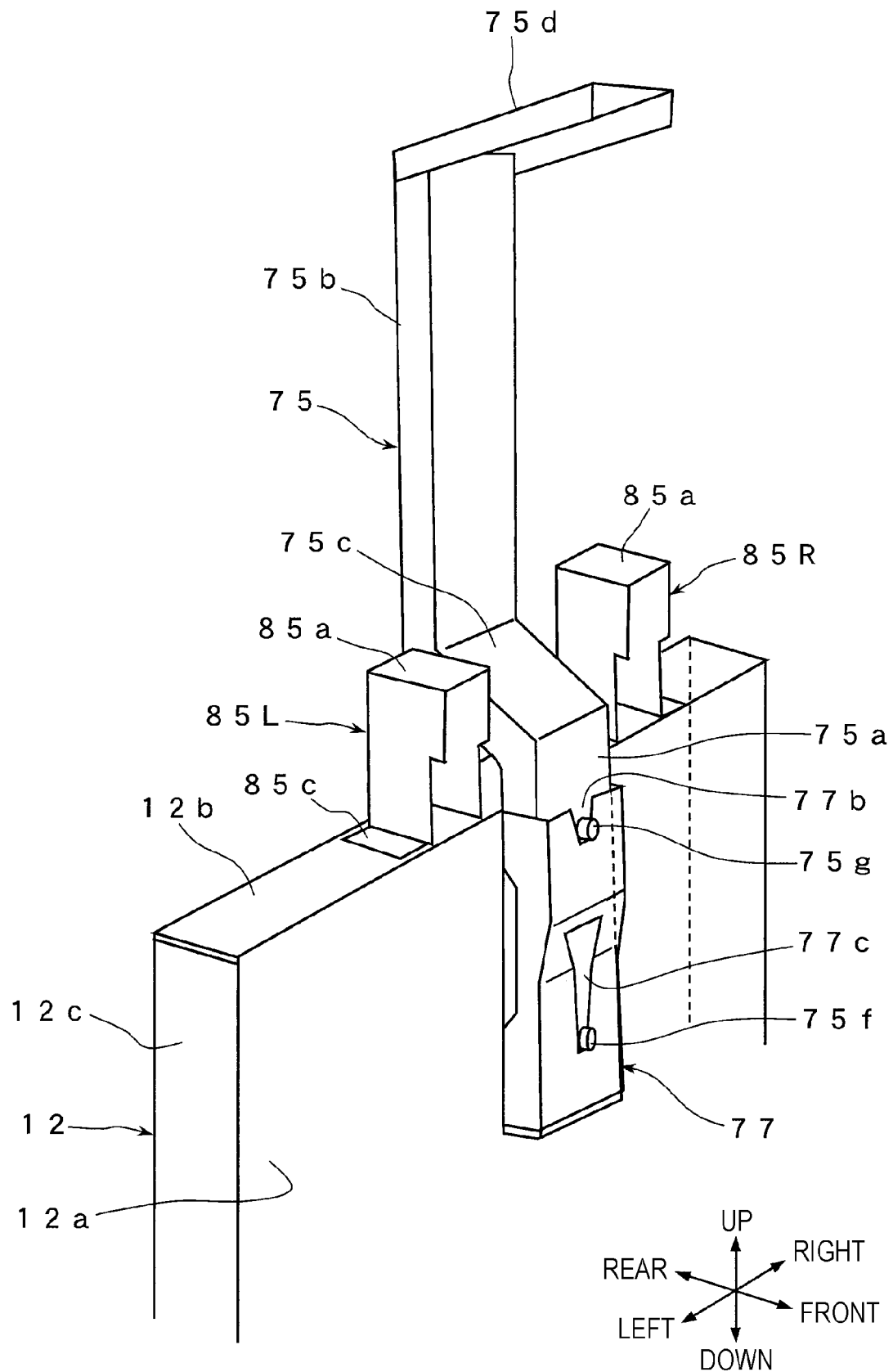
FIG. 8 is a perspective view illustrating the arrangement of a first attachment frame and a second attachment frame.

In this image forming apparatus 1, as shown in FIGS. 5, 6, and 8, the rear frame 12 used is a support frame having a first surface 12a and a second surface 12b that is more bendable than the first surface 12a in response to an external force.

Assuming that the first surface 12a and the second surface 12b locally receive an external force of the same level, the second surface 12b is more bendable than the first surface 12a to elastically deform by, for example, about 1 mm to several millimeters at a local area centered on the part that has received the external force.

The second surface 12b may also be regarded as a surface smaller than the first surface 12a. The expression "smaller than the first surface 12a" implies that, for example, the surface area is smaller if the thickness is the same, or the rigidity is lower by varying an element, such as the reinforcement structure or the material. The reinforcement structure includes, for example, ribs or beams.

Figure 9:
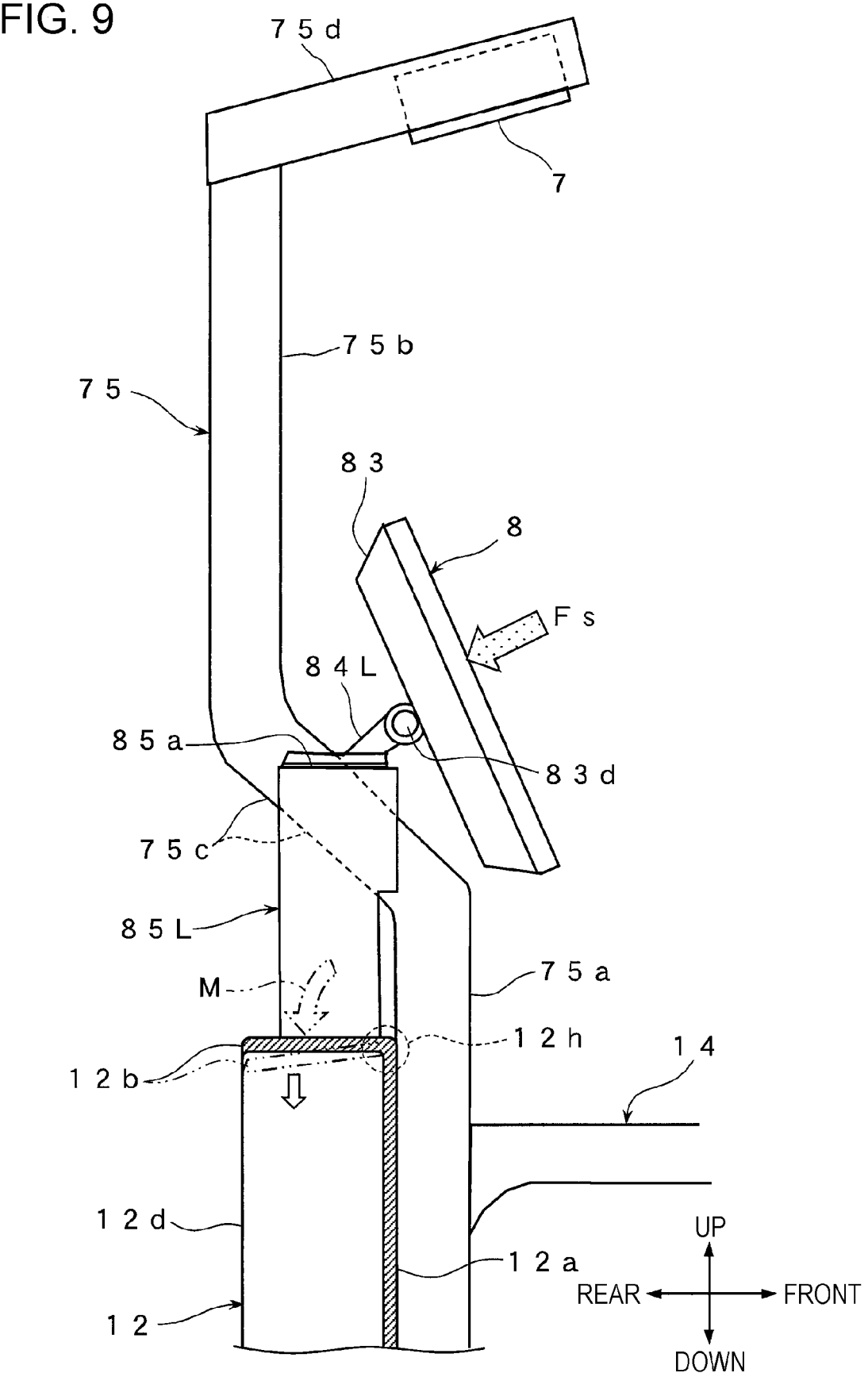
FIG. 9 is a partial cross-sectional view schematically illustrating the reading unit in FIG. 6.

As shown in FIGS. 6, 8, and 9, the rear frame 12 serving as an example of the support frame according to the first exemplary embodiment is constituted of the first surface 12a serving as a vertical surface extending in the up-down direction and the second surface 12b intersecting with an end of the vertical surface, that is, the first surface 12a and serving as an example of a bent surface extending in the lateral direction starting from a rear bent portion 12h. A bent surface is a surface extending from a surface serving as a base via a bent portion serving as a starting point, and may be a flat surface or a curved surface. In particular, a surface extending in the lateral direction is referred to as a lateral surface.

The end of the vertical surface is, for example, the uppermost end, but does not have to be the uppermost end so long as the end is closer to an edge relative to an area where a lower portion 75a, to be described later, of the first attachment frame 75 is attached.

As an alternative to being a frame disposed substantially over the entire rear surface of the housing 10 from the reading unit 50 to the image forming unit 20, the rear frame 12 may be as follows. Specifically, the rear frame 12 may be disposed over a rear surface region from the reading unit 50 to an intermediate point of the image forming unit 20 (e.g., to the medium output section 4 and the imaging section 2), or may be disposed over a rear surface region of the reading unit 50 (excluding a rear surface region of the image forming unit 20).

As shown in FIGS. 4 to 6, the rear frame 12 is joined to frames, such as the front frame 13, the upper frame 14, the left side frame 15, the right side frame 16, and the multiple partition frames 17 and 18, so as to be supported by a box-shaped framework structure or Rahmen structure. Accordingly, the rear frame 12 has increased mechanical strength.

As shown in FIG. 9, the second surface 12b is a first bent portion that bends first following the rear bent portion 12h bent rearward toward the rear surface of the apparatus at the end (i.e., the upper end in this example) of the vertical surface, that is, the first surface 12a.

The second surface 12b functions as a cantilever beam with respect to the first surface 12a. Thus, the second surface 12b has lower mechanical strength than the first surface 12a.

The second surface 12b has substantially the same thickness as the first surface 12a and has a surface area smaller than the surface area of the first surface 12a.

In detail, the first surface 12a is a wide rectangular surface that is long in the up-down direction. In contrast, the second surface 12b is a relatively narrow rectangular surface that is long and narrow in the left-right direction. The second surface 12b has the same width in the left-right direction as the width of the first surface 12a at the end of the first surface 12a and is bent rearward at a predetermined angle (e.g., a substantially right angle) over a predetermined length.

As shown in FIGS. 5 and 8, the rear frame 12 according to the first exemplary embodiment has left and right side surfaces 12c and 12d bent rearward at the left and right ends of the first surface 12a serving as the vertical surface.

With regard to each of the left and right side surfaces 12c and 12d, the length over which the side surface is bent rearward is substantially equal to the length over which the second surface 12b is bent rearward. The left and right ends of the second surface 12b in the rear frame 12 are in contact with the upper ends of the left and right side surfaces 12c and 12d, respectively. Alternatively, the left and right ends of the second surface 12b may be disposed away from the upper ends of the left and right side surfaces 12c and 12d.

As shown in FIGS. 5, 6, and 8, in the image forming apparatus 1, the first attachment frame 75 to which the reader 7 is attached is fixed to the first surface 12a of the rear frame 12, and the second attachment frame 85 to which the operation unit 8 is attached is fixed to the second surface 12b of the rear frame 12.

In this case, as shown in FIGS. 5 and 8, the first attachment frame 75 according to the first exemplary embodiment is constituted of the lower portion 75a, an upper portion 75b, and an attachment portion 75d.

The lower portion 75a is a plate-like portion extending linearly in the up-down direction. The upper portion 75b is a plate-like portion extending linearly in the up-down direction from the upper end of the lower portion 75a via a rear-bent connection portion 75c serving as a connector that bends upward and rearward at an angle. The attachment portion 75d is a plate-like portion for the reader 7 and protrudes diagonally forward from the upper end of the upper portion 75b.

As shown in FIGS. 6, 8, and 9, the first attachment frame 75 has a shape such that the lower portion 75a is fixed to the front surface 10F side of the first surface 12a serving as the vertical surface of the rear frame 12 and the upper portion 75b extends upward above the second surface 12b via the rear-bent connection portion 75c without being in contact with the second surface 12b serving as a first bent surface.

As shown in FIG. 8, the lower portion 75a of the first attachment frame 75 is fitted and fixed to a frame retainer 77 provided at substantially the center, in the left-right direction, of an upper area of the first surface 12a of the rear frame 12, and is also detachable from the frame retainer 77.

The frame retainer 77 is a frame body having a retaining space where the lower portion 75a of the first attachment frame 75 is retained by being fitted between the frame retainer 77 and the first surface 12a of the rear frame 12.

Furthermore, the frame retainer 77 has a slot-like upper fixation hole 77b and a slot-like lower fixation hole 77c that are respectively provided at an upper area and a lower area thereof and that gradually taper downward. The frame retainer 77 retains the lower portion 75a of the first attachment frame 75 in a fitted state in the lower area of the frame retainer 77.

Moreover, the frame retainer 77 is fixed to the first surface 12a of the rear frame 12 by a fixing technique, such as welding or screwing.

In the first attachment frame 75, an upper area and a lower area of the lower portion 75a are respectively provided with a columnar upper fixation protrusion 75g and a columnar lower fixation protrusion 75f that are fixed by being fitted to the upper fixation hole 77b and the lower fixation hole 77c of the frame retainer 77 from above.

The upper fixation protrusion 75g and the lower fixation protrusion 75f are provided with grooves having a function for receiving the edges of the upper fixation hole 77b and the lower fixation hole 77c when the upper fixation protrusion 75g and the lower fixation protrusion 75f are fitted to the upper fixation hole 77b and the lower fixation hole 77c, so as to prevent the upper fixation protrusion 75g and the lower fixation protrusion 75f from moving (i.e., rattling) in the front-rear direction.

Alternatively, instead of using the frame retainer 77, the first attachment frame 75 may be directly fixed to the first surface 12a of the rear frame 12 by a fixing technique, such as welding or screwing.

As shown in FIGS. 5 and 8, the second attachment frame 85 according to the first exemplary embodiment is constituted of left and right second attachment frames 85L and 85R at the left and right sides of the first attachment frame 75, respectively, as viewed from the front surface 10F of the apparatus. The left and right second attachment frames 85L and 85R are arranged with a distance from the first attachment frame 75.

The left and right second attachment frames 85L and 85R individually have attachment surfaces 85a to which the left and right attachment jigs 84L and 84R of the operation unit 8 are to be attached. Each of the left and right second attachment frames 85L and 85R according to the first exemplary embodiment has a rectangular-parallelepiped external shape that is long in the up-down direction, and the upper surface thereof serves as a flat attachment surface 85a.

The left and right second attachment frames 85L and 85R are fixed to the second surface 12b of the rear frame 12 by a fixing technique, such as by screwing or partially fitting bent portions 85c to the second surface 12b. Each bent portion 85c is obtained by bending the lower end of the corresponding left or right second attachment frame 85L or 85R leftward or rightward.

As shown in FIGS. 5 and 7, in the image forming apparatus 1, the first attachment frame 75 and the left and right second attachment frames 85L and 85R are arranged in a noncontact state where the frames are not in contact with each other. In detail, the left and right second attachment frames 85L and 85R are arranged at the left and right sides of the upper portion 75b and the rear-bent connection portion 75c of the first attachment frame 75 with a predetermined distance therefrom.

Furthermore, as shown in FIGS. 5, 8, and 9, in the image forming apparatus 1, the first attachment frame 75 is disposed without being in contact with the second surface 12b of the rear frame 12, as mentioned above. The second attachment frame 85 is disposed toward the center of the second surface 12b of the rear frame 12 in a state where the second attachment frame 85 is located away from the left and right sides of the first attachment frame 75.

Usage and Operation of Image Forming Apparatus and Reading Device

The image forming apparatus 1 having the above-described configuration is capable of forming an image corresponding to image information input from a connected external apparatus onto the recording medium 9 in the image forming unit 20. In this case, the recording medium 9 having the image formed thereon is discharged and output to the medium output section 4.

Furthermore, the image forming apparatus 1 is capable of causing the reader 7 in the reading unit 50 to read the read target object 90 placed on the base 6 and displaying the read information as a read image on the display 82 of the operation unit 8.

Moreover, the image forming apparatus 1 is capable of loading the read information of the read target object 90 read by the reading unit 50 as image information into the image forming unit 20 and forming an image corresponding to the image information onto the recording medium 9. Accordingly, the image forming apparatus 1 is also capable of recording the read image of the read target object 90 onto the recording medium 9 and outputting the recording medium 9.

In the image forming apparatus 1, for example, when the reading unit 50 is to read the read target object 90, the user controls the apparatus by operating the operation unit 8, thereby starting the reading process.

In this case, when the user operates the operation unit 8 to start the reading process, the reader 7 operates to read the read target object 90 placed on the base 6.

However, when this reading process starts, the operation unit 8 is vibrated due to the user touching and manually operating the operation unit 8, and the vibration is transmitted from the second attachment frame 85 to which the operation unit 8 is attached toward the first attachment frame 75 to which the reader 7 is attached, ultimately causing the reader 7 to shake.

When such shaking of the reader 7 occurs, the read information obtained by the shaking reader 7 becomes distorted. As a result, when the read information is displayed on the display 82, the displayed image becomes distorted. When the image forming unit 20 forms an image by using the read information as image information, the formed image becomes distorted.

In contrast, in the image forming apparatus 1, the first attachment frame 75 to which the reader 7 is attached in the reading unit 50, that is, the reading device 5, is fixed to the first surface 12a of the rear frame 12, and the second attachment frame 85 to which the operation unit 8 is attached is fixed to the second surface 12b of the rear frame 12.

Therefore, in the image forming apparatus 1, shaking of the reader 7 occurring when the operation unit 8 is operated by being touched may be suppressed, as compared with a case where both the first attachment frame 75 and the second attachment frame 85 are fixed to the same surface, such as the first surface 12a, of the rear frame 12.

It is assumed that shaking of the reader 7 may be suppressed due to the following reasons.

Specifically, as shown in FIG. 9, when the operation unit 8 is operated, a force Fs caused by pressure occurring in response to the operation is applied to the operation unit 8 as an external force acting rearward and downward at an angle, and the force Fs is transmitted as a force that tilts the left and right second attachment frames 85L and 85R rearward via the left and right attachment jigs 84L and 84R. In this case, a bending moment (stress) M acting downward starting from the rear bent portion 12h occurs in the second surface 12b of the rear frame 12 where the left and right second attachment frames 85L and 85R are fixed.

The second surface 12b bends to elastically deform downward, as indicated with a double-dot chain line in FIG. 9, by a predetermined amount at a local area centered on the part where the left and right second attachment frames 85L and 85R are fixed. In contrast, the first surface 12a to which the first attachment frame 75 of the rear frame 12 is fixed hardly bends or moves.

Accordingly, the force transmitted to the left and right second attachment frames 85L and 85R in response to the operation performed on the operation unit 8 may be absorbed by the bending of the second surface 12b of the rear frame 12, and it is conceivable that shaking of the reader 7 may be suppressed, as compared with a case where the operation unit 8 and the reader 7 are attached to the first surface 12a of the rear frame 12.

In this image forming apparatus 1, the first attachment frame 75 and the left and right second attachment frames 85L and 85R are arranged in a noncontact state. The first attachment frame 75 and the second attachment frame 85 are arranged in a state where the two attachment frames 75 and 85 are not in contact with each other or are not connected by another frame (excluding a state where the two attachment frames 75 and 85 are connected via covers that cover the frames, to be described later), so that vibration occurring when the operation unit 8 is operated by being touched is not transmitted from the second attachment frame 85 to the first attachment frame 75 via the rear frame 12.

Second Exemplary Embodiment

Figure 10:
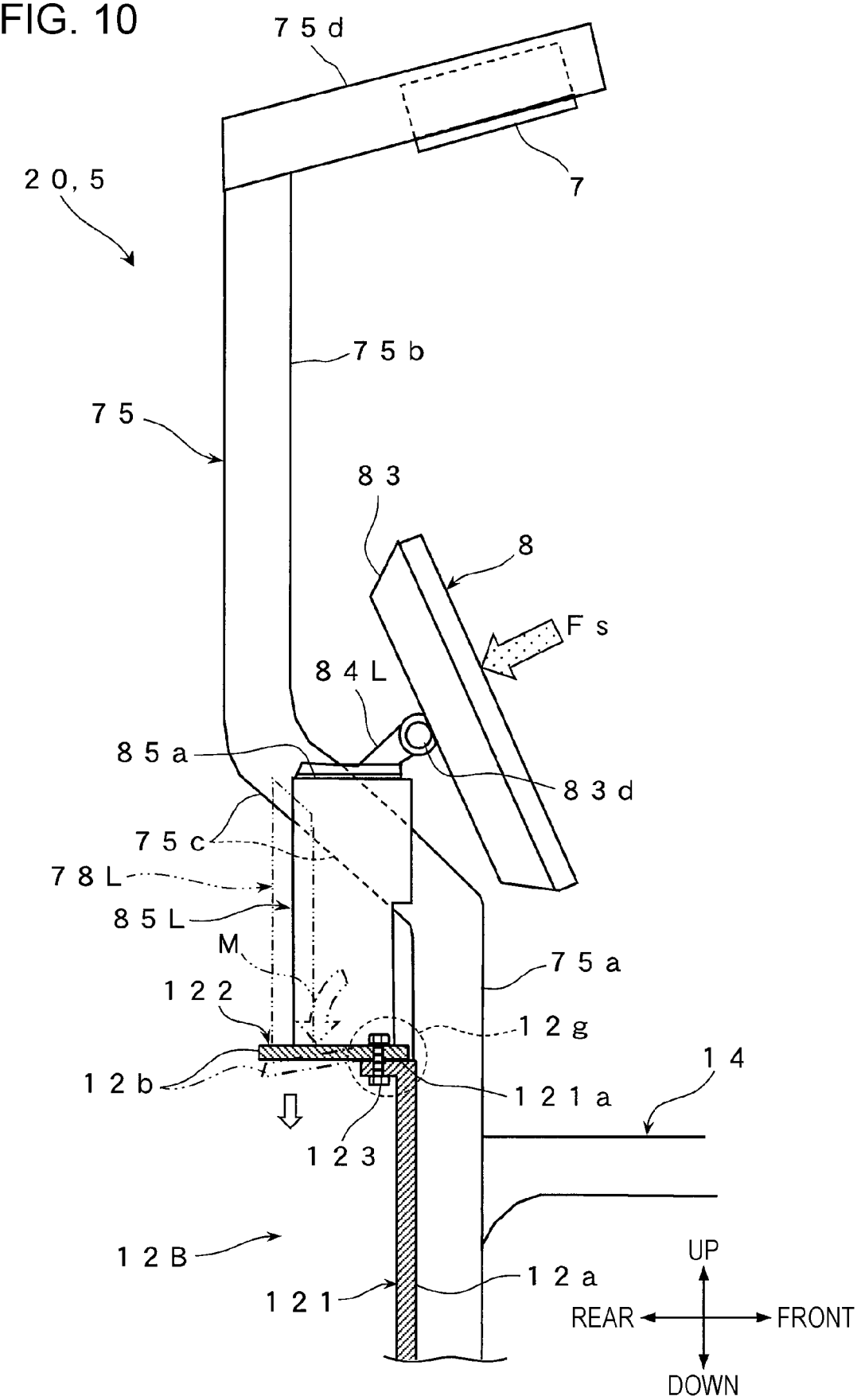
FIG. 10 is a partial cross-sectional view schematically illustrating a reading unit according to a second exemplary embodiment.

FIG. 10 is a partial cross-sectional view illustrating a part (such as the reading unit 50 or the reading device 5 and a rear frame 12B) of an image forming apparatus according to a second exemplary embodiment of the disclosure.

The reading unit 50 or the reading device 5 according to the second exemplary embodiment is different from the reading unit 50 or the reading device 5 according to the first exemplary embodiment in that the rear frame 12 has been changed to the rear frame 12B having a configuration partially different therefrom, but has the same configuration with regard to other components.

Therefore, in the following description and the drawings, identical components will be given the same reference signs used in the first exemplary embodiment and will not be described unless otherwise necessary.

In the rear frame 12B according to the second exemplary embodiment, the first surface 12a serving as the vertical surface and the second surface 12b serving as the lateral surface are not continuous. Instead, as shown in FIG. 10, the second surface 12b is provided as a surface of a member 122 serving as the lateral surface connected and fixed to an end 121a of a member 121 serving as the vertical surface, that is, the first surface 12a.

Specifically, the second surface 12b is provided as a surface fixed using a fixing technique, such as a bolt-and-nut fastener 123 or welding, by joining a front end of the plate-like member 122 serving as the lateral surface and having a rectangular shape that is long and narrow in the left-right direction to a bent portion bent rearward at the end 121a of the plate-like member 121 serving as the vertical surface and having a rectangular shape that is long in the up-down direction. In this case, an area where the end 121a of the member 121 serving as the first surface 12a and the member 122 serving as the second surface 12b are fixed in contact with each other becomes a fixation connection area 12g. The end 121a of the member 121 in this example is an uppermost end, but is not limited thereto.

Similar to the rear frame 12 according to the first exemplary embodiment, the rear frame 12B is also a support frame having the first surface 12a and the second surface 12b that is smaller than the first surface 12a and more bendable than the first surface 12a in response to an external force.

Although it is desirable that the member 121 serving as the vertical surface and the member 122 serving as the lateral surface be composed of the same material and have the same thickness, the two members may be composed of different materials and have different thicknesses. In the case of different materials and different thicknesses, the relationship between the two members is such that the second surface 12b is more bendable than the first surface 12a.

Furthermore, in the reading unit 50 or the reading device 5 of the image forming apparatus 1 using this rear frame 12B, as shown in FIG. 10, the first attachment frame 75 supporting the reader 7 is fixed to the first surface 12a of the rear frame 12B, and the second attachment frame 85 supporting the operation unit 8 is fixed to the second surface 12b of the rear frame 12B.

The first attachment frame 75 and the second attachment frame 85 have the same configurations as the first attachment frame 75 and the second attachment frame 85 according to the first exemplary embodiment.

It is assumed that shaking of the reader 7 may be suppressed due to reasons substantially similar to those in the case of the image forming apparatus 1 according to the first exemplary embodiment.

Specifically, as shown in FIG. 10, when the operation unit 8 is operated, the force Fs occurring in response to the operation is applied to the operation unit 8 as an external force acting rearward and downward at an angle, and the force Fs is transmitted as a force that tilts the left and right second attachment frames 85L and 85R rearward. Accordingly, a bending moment (stress) M acting downward starting from the fixation connection area 12g occurs in the second surface 12b of the rear frame 12B where the left and right second attachment frames 85L and 85R are fixed.

The second surface 12b of the rear frame 12B bends to elastically deform downward, as indicated with the double-dot chain line in FIG. 10, by a predetermined amount at a local area centered on the part where the left and right second attachment frames 85L and 85R are fixed. In contrast, the first surface 12a of the rear frame 12B may bend or move less than the second surface 12b of the rear frame 12B.

Accordingly, the force transmitted to the left and right second attachment frames 85L and 85R in response to the operation performed on the operation unit 8 may be absorbed by the bending of the second surface 12b of the rear frame 12B, and it is conceivable that shaking of the reader 7 may be suppressed, as compared with a case where the operation unit 8 and the reader 7 are attached to the first surface 12a of the rear frame 12B.

Third Exemplary Embodiment

Figure 11:
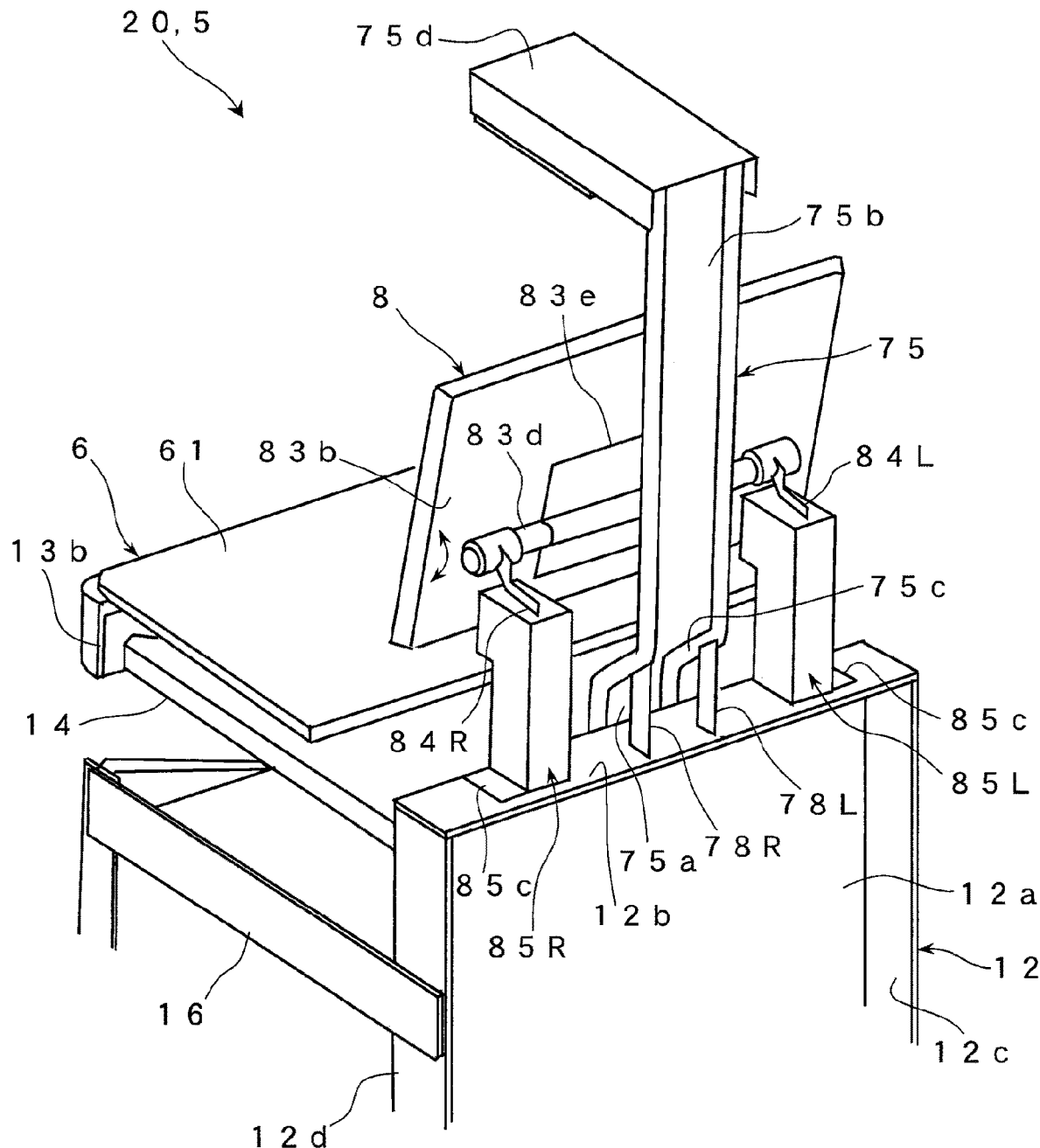
FIG. 11 is a perspective view illustrating the rear side of a reading unit according to a third exemplary embodiment.
Figure 11:
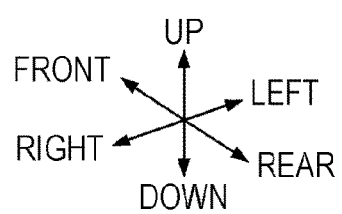

FIG. 11 is a rear view illustrating a part (such as the reading unit 50 or the reading device 5) of an image forming apparatus according to a third exemplary embodiment of the disclosure.

The reading unit 50 or the reading device 5 according to the third exemplary embodiment is different from the reading unit 50 or the reading device 5 according to the first exemplary embodiment in that the first attachment frame 75 has been changed by being given additional components, but has the same configuration with regard to other components.

Therefore, in the following description and the drawings, identical components will be given the same reference signs used in the first exemplary embodiment and will not be described unless otherwise necessary.

Figure 12:
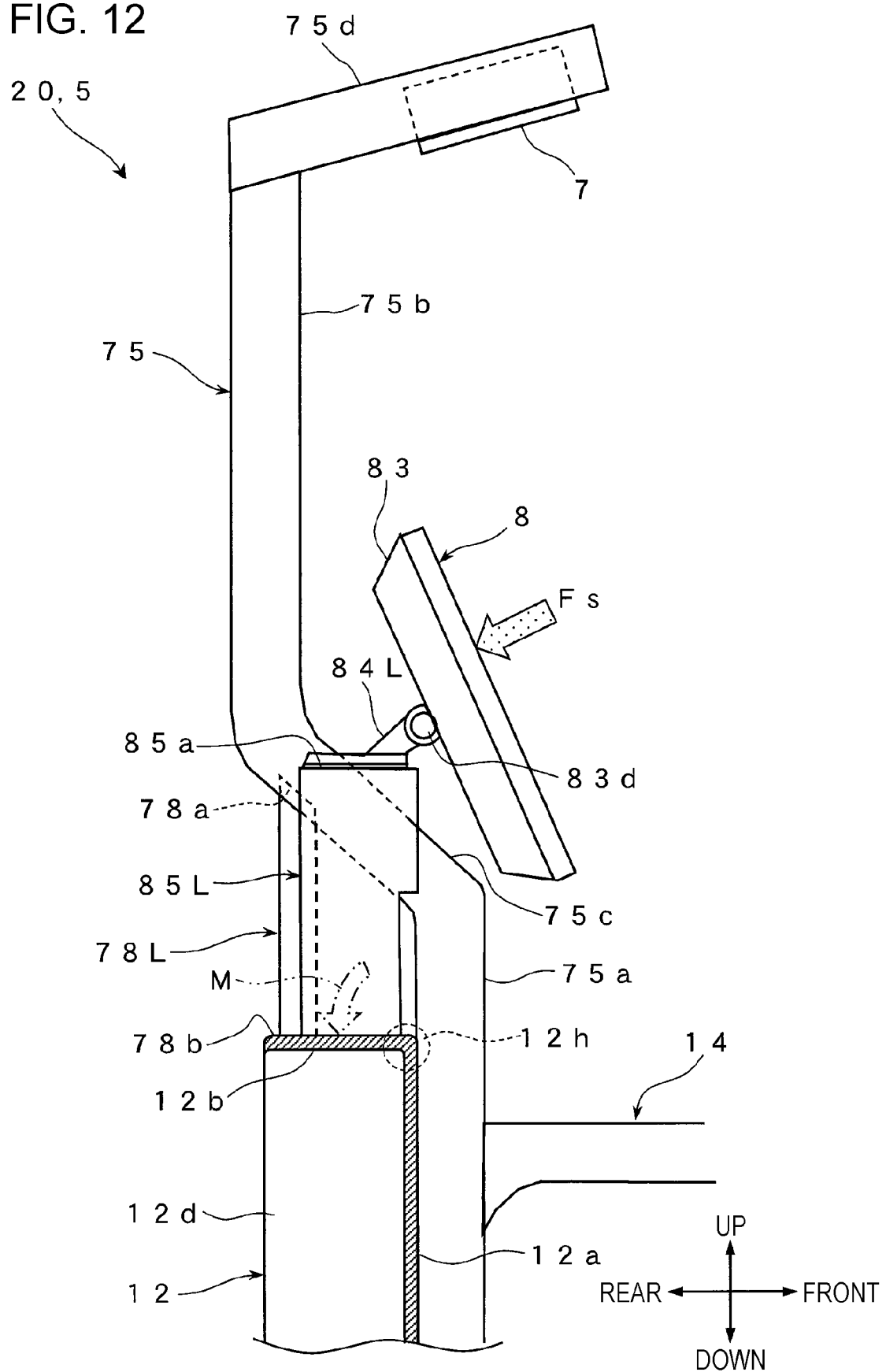
FIG. 12 is a partial cross-sectional view schematically illustrating the reading unit in FIG. 11.

As shown in FIGS. 11 and 12, the first attachment frame 75 is provided with left and right coupling frames 78L and 78R that couple the upper portion 75b serving as an upward extending portion of the second surface 12b of the rear frame 12 and the second surface 12b serving as a first bent surface of the rear frame 12.

The left and right coupling frames 78L and 78R are plate-like frames and each have an upper end 78a attached to the lower end (including the upper end of the rear-bent connection portion 75c) of the upper portion 75b of the first attachment frame 75 and a lower end 78b attached to the second surface 12b of the rear frame 12.

The left and right coupling frames 78L and 78R are respectively arranged at the left and right ends of the rear-bent connection portion 75c of the first attachment frame 75 and have an auxiliary function of suppressing shaking of the first attachment frame 75. Therefore, the left and right coupling frames 78L and 78R may be thinner and narrower than the first attachment frame 75.

Moreover, the upper ends and the lower ends of the left and right coupling frames 78L and 78R are attached by using a fixing technique, such as screwing, welding, or fitting.

The rear frame 12 including the left and right coupling frames 78L and 78R may suppress shaking caused by twisting of the first attachment frame 75 in the lateral direction.

Therefore, in the image forming apparatus 1, shaking of the first attachment frame 75 may be suppressed when the operation unit 8 is operated by being touched, so that shaking of the reader 7 may be further suppressed.

It is assumed that shaking of the reader 7 may be suppressed due to the following reasons.

Specifically, as shown in FIG. 12, when the operation unit 8 is operated, the force Fs occurring in response to the operation is applied to the operation unit 8 as an external force acting rearward and downward at an angle, and the force Fs is transmitted as a force that tilts the left and right second attachment frames 85L and 85R rearward. Accordingly, a bending moment (stress) M acting downward starting from the rear bent portion 12h theoretically occurs in the second surface 12b of the rear frame 12 where the left and right second attachment frames 85L and 85R are fixed.

However, shaking of the first attachment frame 75 in the lateral direction may be suppressed by the left and right coupling frames 78L and 78R.

Moreover, the second surface 12b of the rear frame 12 bends to elastically deform downward by a predetermined amount at a local area centered on the part where the left and right second attachment frames 85L and 85R are fixed. In contrast, the second surface 12b is less likely to bend due to the increased rigidity according to the left and right coupling frames 78L and 78R of the first attachment frame 75. Furthermore, with the coupling frames 78L and 78R having higher strength than the first attachment frame 75, the first attachment frame 75 bends in accordance with the coupling frames 78L and 78R when the second surface 12b of the rear frame 12 bends. Thus, the coupling frames 78L and 78R used are thinner and/or narrower than the first attachment frame 75.

Accordingly, vibration is less likely to occur when the operation unit 8 is operated, and the second surface 12b in addition to the first surface 12a of the rear frame 12 hardly bends.

Fourth Exemplary Embodiment

Figure 13:
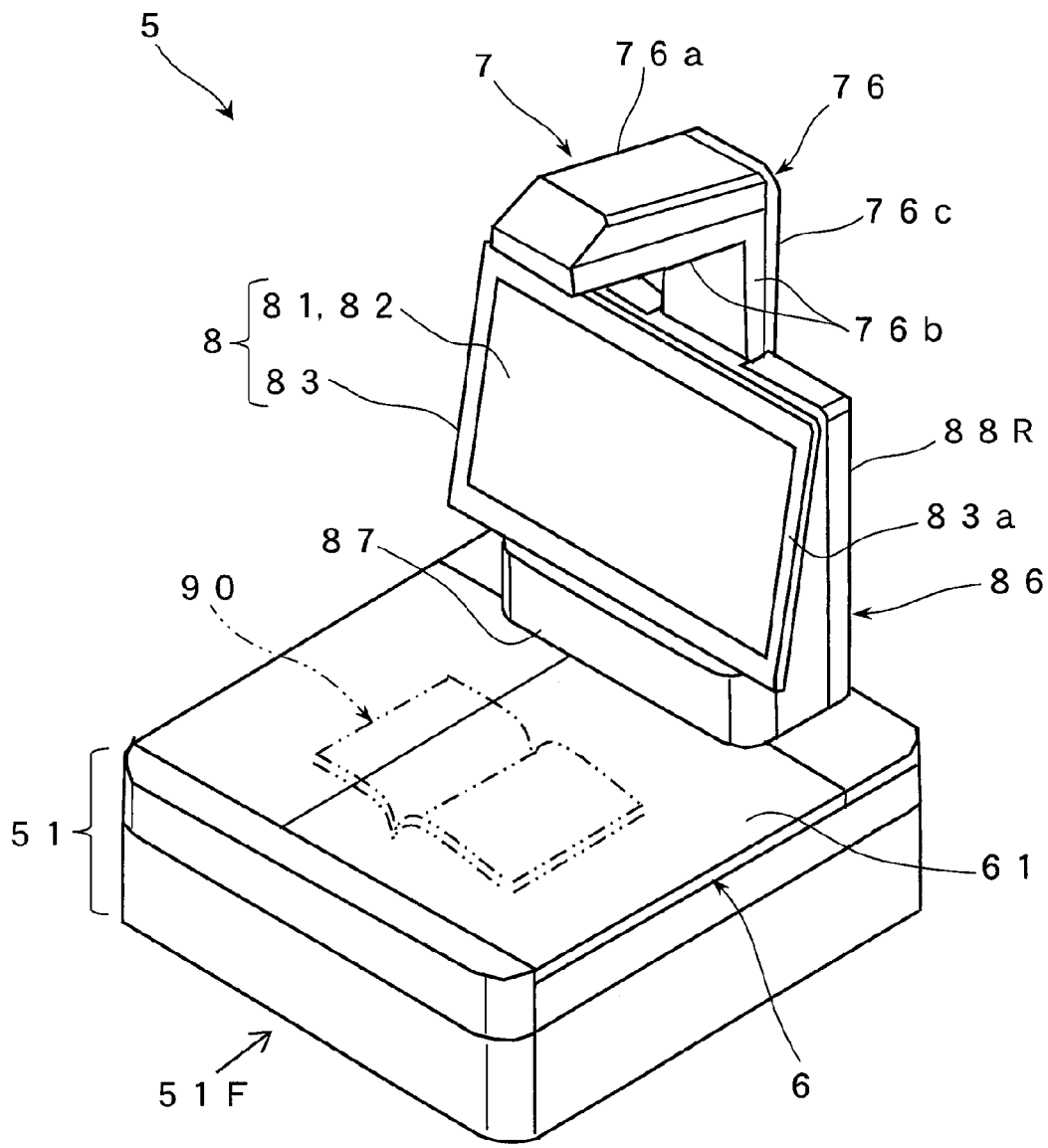
FIG. 13 is a perspective view illustrating a reading device according to a fourth exemplary embodiment.
Figure 13:
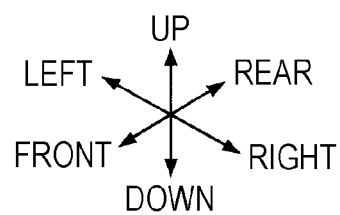

FIG. 13 illustrates a reading device 5 according to a fourth exemplary embodiment of the disclosure.

The reading device 5 according to the fourth exemplary embodiment has a configuration similar to that of the reading unit 50 or the reading device 5 excluding the housing 10 and the image forming unit 20 in the image forming apparatus 1 according to the first exemplary embodiment.

Therefore, in the following description and the drawings, identical components will be given the same reference signs used in the first exemplary embodiment and will not be described unless otherwise necessary.

Figure 14:
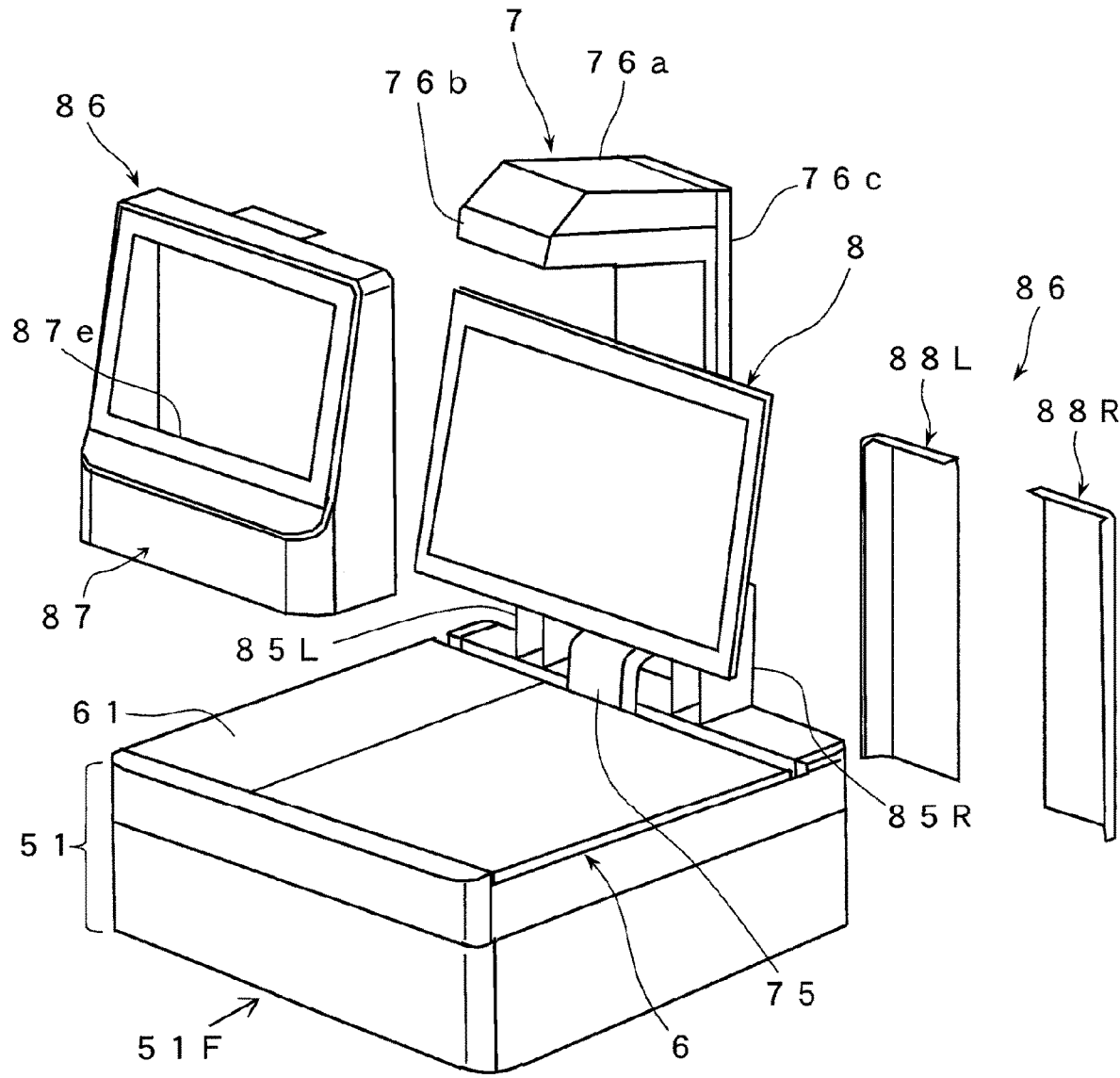
FIG. 14 is a perspective view illustrating the front side of the reading device from which the second cover has been removed.
Figure 14:
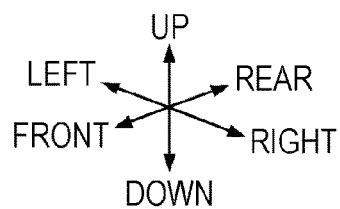
Figure 15:
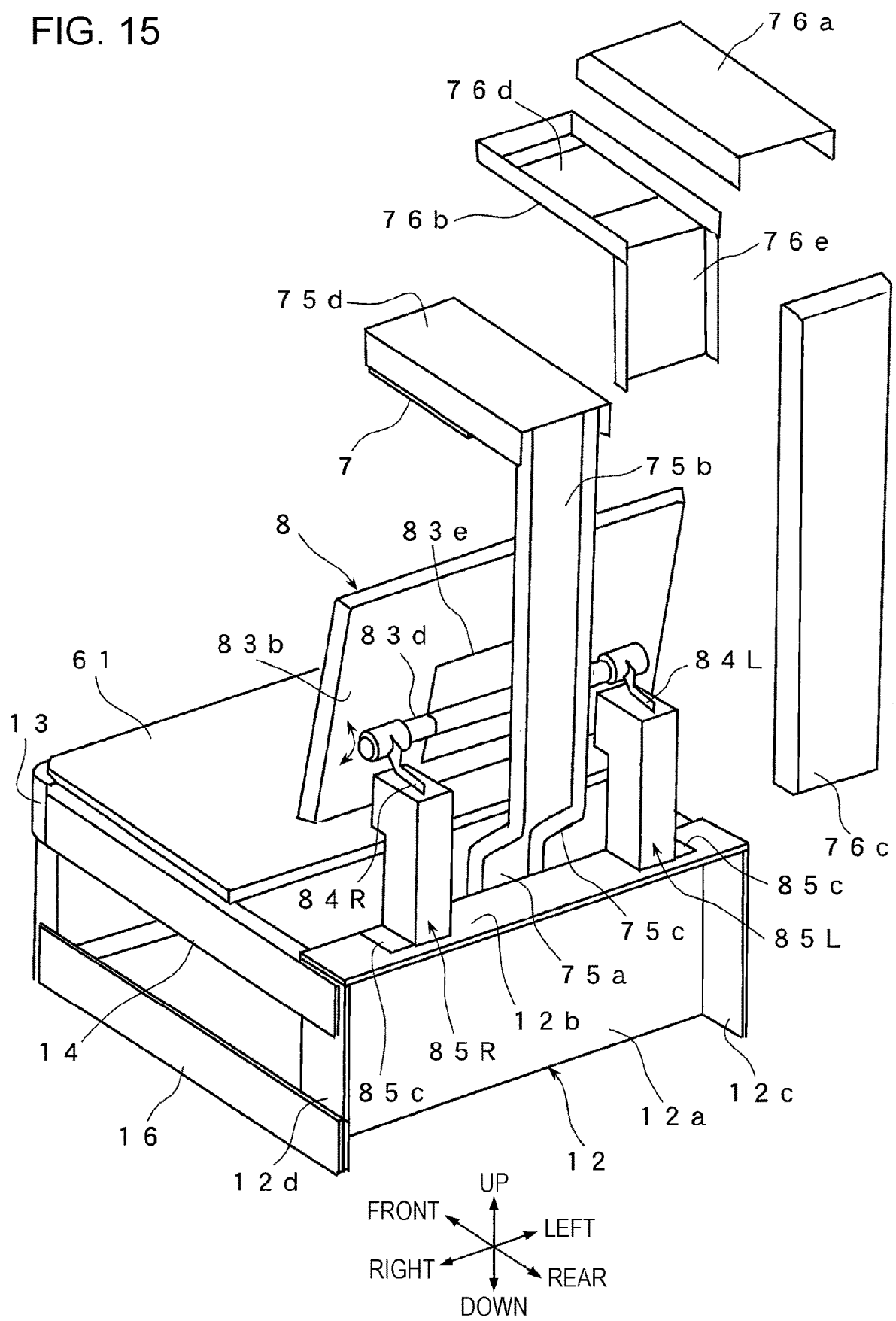
FIG. 15 is a perspective view illustrating the rear side of the reading device from which the first cover has been removed.

As shown in FIGS. 13 to 15, the reading device 5 includes the base 6, the reader 7, the operation unit 8, the first attachment frame 75, the second attachment frame 85, and the rear frame 12.

The base 6 is where the read target object 90 is to be placed. The reader 7 reads the read target object 90 placed on the base 6. The operation unit 8 is used for operating the device by touching. The first attachment frame 75 is used for attaching the reader 7 to a position above the base 6. The second attachment frame 85 is used for attaching the operation unit 8 to a position above the base 6. The rear frame 12 is an example of a support frame having the first surface 12a and the second surface 12b.

In FIG. 13, reference sign 51 denotes a housing of the reading device 5, reference sign 51F denotes a front surface of the device, reference sign 76 denotes a first cover that covers the first attachment frame 75, and reference sign 86 denotes a second cover that covers the second attachment frame 85.

The housing 51 is a structural body having a predetermined structure and shape and formed of components, such as multiple frames and an external cover. As shown in FIG. 13, the housing 51 according to the fourth exemplary embodiment is a rectangular-parallelepiped structural body that is relatively short in the up-down direction, that is, has a relatively small height.

Figure 16:
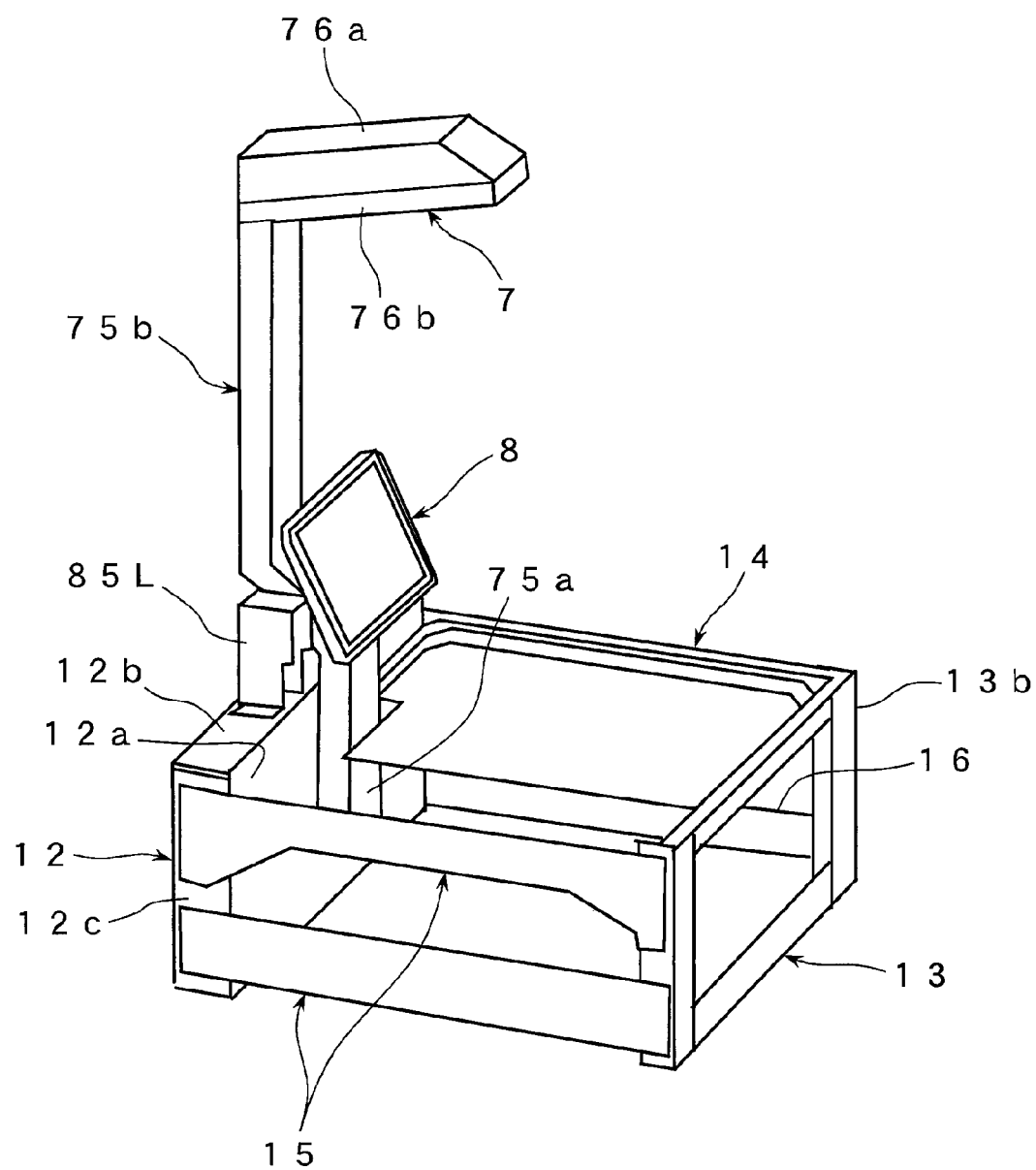
FIG. 16 is a perspective view illustrating a part of the reading device, such as a framework section and attachment frames.

Furthermore, as shown in FIGS. 15 and 16, the internal framework section of the housing 51 includes frames, such as the rear frame 12, the front frame 13, the upper frame 14, upper and lower left side frames 15, and the right side frame 16.

In the reading device 5, the rear frame 12 used is a support frame having the first surface 12a and the second surface 12b that is more bendable than the first surface 12a in response to an external force or that is smaller than the first surface 12a, similar to the case of the reading unit 50 or the reading device 5 according to the first exemplary embodiment. The rear frame 12 according to the fourth exemplary embodiment is shorter in the up-down direction (due to not having the image forming unit 20) than the rear frame 12 of the housing 10 according to the first exemplary embodiment.

Furthermore, in the reading device 5, as shown in FIGS. 15 and 16, the first attachment frame 75 to which the reader 7 is attached is fixed to the first surface 12a of the rear frame 12, and the second attachment frame 85 to which the operation unit 8 is attached is fixed to the second surface 12b of the rear frame 12, similar to the case of the reading unit 50 or the reading device 5 according to the first exemplary embodiment. Detailed configurations related to the first attachment frame 75 and the second attachment frame 85 are similar to the case of the reading unit 50 or the reading device 5 according to the first exemplary embodiment.

The reading device 5 is capable of using the reader 7 to read the read target object 90 placed on the base 6 and displaying the read information as a read image on the display 82 of the operation unit 8.

Moreover, the reading device 5 is capable of loading the read information of the read target object 90 as image information into, for example, an output apparatus, such as an image forming apparatus connected to the reading device 5 in a wireless or wired manner, and subsequently using an image corresponding to the image information to be formed on the recording medium 9. Accordingly, the reading device 5 may be used as an image reading device of an image forming apparatus.

In the reading device 5, when the read target object 90 is to be read, the user controls the device by operating the operation unit 8, thereby starting the reading process.

In this case, when the user operates the operation unit 8 to start the reading process, the reader 7 operates to read the read target object 90 placed on the base 6.

However, when this reading process starts in the reading device 5, vibration similarly occurs due to the user touching the operation unit 8 to manually operate the operation unit 8. Thus, in the reading device 5, the vibration is transmitted from the second attachment frame 85 to which the operation unit 8 is attached toward the first attachment frame 75 to which the reader 7 is attached, ultimately causing the reader 7 to shake.

In the reading device 5, the first attachment frame 75 to which the reader 7 is attached is fixed to the first surface 12a of the rear frame 12, and the second attachment frame 85 to which the operation unit 8 is attached is fixed to the second surface 12b of the rear frame 12.

The different components used in the second and third exemplary embodiments may similarly be applied in the reading device 5.

Modifications

The exemplary embodiments of the disclosure are not to be limited to the contents described in the first to fourth exemplary embodiments, and may include, for example, modifications to be described below.

The overall shape of the rear frame 12 as an example of a support frame is not limited to the shape described in the first exemplary embodiment.

For example, in a case where the rear frame 12 has two or more bent surfaces, the second surface 12b to which the second attachment frame 85 is fixed may serve as a second bent surface or onward instead of the first bent surface. Furthermore, with regard to the second surface 12b, the attachment surfaces 85a (see FIG. 9) to which the second attachment frame 85 is fixed may be inclined surfaces instead of horizontal surfaces.

Moreover, as indicated with the double-dot chain line in FIG. 10, the rear frame 12 may be a support frame including coupling frames 78 (i.e., left and right coupling frames 78L and 78R), as in the rear frame 12B according to the second exemplary embodiment.

As another alternative, the support frame having the first surface and the second surface is not limited to the rear frame 12 and may be another frame. The support frame may be, for example, one of the left and right side frames.

The second attachment frame 85 to which the operation unit 8 is attached may be a single attachment frame disposed at one of the left and right sides of the first attachment frame 75 with a distance from the first attachment frame 75.

However, for suppressing an impact or vibration occurring when the operation unit 8 is operated, it is desirable that the second attachment frame 85 be constituted of the left and right second attachment frames 85L and 85R arranged at both the left and right sides of the first attachment frame 75 with a distance from the first attachment frame 75, as described in the first exemplary embodiment.

The overall shape of the first attachment frame 75 to which the reader 7 is attached is not limited to the shape described in the first exemplary embodiment.

In the first attachment frame 75, for example, a part excluding the lower portion 75a to be fixed to the first surface 12a of the rear frame 12 may have a movable structure, such as a rotatable structure, for adjusting the position and orientation of the reader 7.

The operation unit 8 has the nature of inducing the aforementioned problem related to the reading process of the reader 7 caused as result of the first attachment frame 75 of the reader 7 receiving vibration occurring in response to a touch operation. Therefore, in concept, the operation unit 8 also includes a third device, such as a fingerprint authenticator or an authentication card reader.

However, as compared with an operation unit including the aforementioned touchscreen or physical button, such a third device has the nature of vibrating less due to having few elements that are manually operated by being touched and pressed, and has enough time from the operation until the start of the reading process by the reader 7.

Consequently, even in a case where the aforementioned third device is disposed close to the reader 7, the configuration related to the first attachment frame 75 and the second attachment frame 85 as in each exemplary embodiment of the disclosure does not have to be used for the third device.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A reading device comprising:
a base on which a read target object is placed;
a reader that reads the read target object placed on the base;
a first attachment frame to which the reader is attached such that the reader is disposed above the base;
an operation unit that is used for operating the reading device by touching;
a second attachment frame to which the operation unit is attached such that the operation unit is disposed above the base; and
a support frame that has a first surface and a second surface more bendable than the first surface in response to an external force,
wherein the first attachment frame is fixed to the first surface of the support frame, and
wherein the second attachment frame is fixed to the second surface of the support frame.

2. The reading device according to claim 1,
wherein the first attachment frame and the second attachment frame are disposed in a state where the first attachment frame and the second attachment frame are not in contact with each other.

3. The reading device according to claim 2,
wherein the operation unit is disposed forward of the first attachment frame in a direction extending toward a front side of the reading device, and
wherein, as viewed from the front side of the reading device, the second attachment frame is disposed at one of or each of left and right sides of the first attachment frame with a distance from the first attachment frame.

4. The reading device according to claim 1,
wherein, in the support frame, the first surface serves as a vertical surface extending in a vertical direction and the second surface serves as a lateral surface extending in a lateral direction and intersecting with an end of the vertical surface.

5. The reading device according to claim 4,
wherein the lateral surface as the second surface of the support frame is a first bent surface continuing to a rear bent portion bent rearward toward a rear side of the reading device at the end of the vertical surface as the first surface,
wherein the first attachment frame has a lower portion fixed to a front side, of the reading device, of the vertical surface of the support frame and an upper portion that extends upward above the first bent surface without being in contact with the first bent surface serving as the lateral surface, and
wherein the second attachment frame is fixed to the first bent surface.

6. The reading device according to claim 5,
wherein the first attachment frame includes a coupling frame that couples the upward extending portion and the first bent surface.

7. The reading device according to claim 4,
wherein the lateral surface as the second surface of the support frame is a surface of a member constituting the lateral surface fixed by being connected to an end of a member constituting the vertical surface as the first surface,
wherein the first attachment frame has a lower portion fixed to a front side, of the reading device, of the vertical surface of the support frame and an upper portion extending upward above the lateral surface without being in contact with the surface of the member constituting the lateral surface, and
wherein the second attachment frame is fixed to the surface of the member constituting the lateral surface.

8. The reading device according to claim 7,
wherein the first attachment frame includes a coupling frame that couples the upward extending portion and the surface of the member constituting the lateral surface.

9. An image forming apparatus comprising:
a reading unit that reads a read target object placed on a base from above the base; and
an image forming unit that forms an image corresponding to image information possibly containing information read by the reading unit onto a recording medium,
wherein the reading unit includes the reading device according to claim 1.

10. A reading device comprising:
a base on which a read target object is placed;
a reader that reads the read target object placed on the base;
a first attachment frame to which the reader is attached such that the reader is disposed above the base;
an operation unit that is used for operating the reading device by touching;
a second attachment frame to which the operation unit is attached such that the operation unit is disposed above the base; and
a support frame that has a first surface and a second surface smaller than the first surface,
wherein the first attachment frame is fixed to the first surface of the support frame, and
wherein the second attachment frame is fixed to the second surface of the support frame.

11. The reading device according to claim 10,
wherein the first attachment frame and the second attachment frame are disposed in a state where the first attachment frame and the second attachment frame are not in contact with each other.

12. The reading device according to claim 11,
wherein the operation unit is disposed forward of the first attachment frame in a direction extending toward a front side of the reading device, and
wherein, as viewed from the front side of the reading device, the second attachment frame is disposed at one of or each of left and right sides of the first attachment frame with a distance from the first attachment frame.

13. The reading device according to claim 10,
wherein, in the support frame, the first surface serves as a vertical surface extending in a vertical direction and the second surface serves as a lateral surface extending in a lateral direction and intersecting with an end of the vertical surface.

14. The reading device according to claim 13,
wherein the lateral surface as the second surface of the support frame is a first bent surface continuing to a rear bent portion bent rearward toward a rear side of the reading device at the end of the vertical surface as the first surface,
wherein the first attachment frame has a lower portion fixed to a front side, of the reading device, of the vertical surface of the support frame and an upper portion that extends upward above the first bent surface without being in contact with the first bent surface serving as the lateral surface, and
wherein the second attachment frame is fixed to the first bent surface.

15. The reading device according to claim 14,
wherein the first attachment frame includes a coupling frame that couples the upward extending portion and the first bent surface.

16. The reading device according to claim 13,
wherein the lateral surface as the second surface of the support frame is a surface of a member constituting the lateral surface fixed by being connected to an end of a member constituting the vertical surface as the first surface,
wherein the first attachment frame has a lower portion fixed to a front side, of the reading device, of the vertical surface of the support frame and an upper portion extending upward above the lateral surface without being in contact with the surface of the member constituting the lateral surface, and
wherein the second attachment frame is fixed to the surface of the member constituting the lateral surface.

17. The reading device according to claim 16,
wherein the first attachment frame includes a coupling frame that couples the upward extending portion and the surface of the member constituting the lateral surface.

* * * * *